United States Patent [19]

MacDonald

[11] Patent Number: 4,699,172
[45] Date of Patent: Oct. 13, 1987

[54] HANDLE VALVE ASSEMBLY

[75] Inventor: Robert D. MacDonald, Mesa, Ariz.

[73] Assignee: Masco Corporation, Taylor, Mich.

[21] Appl. No.: 868,095

[22] Filed: May 28, 1986

Related U.S. Application Data

[60] Continuation of Ser. No. 583,758, Feb. 27, 1984, Pat. No. 4,640,457, which is a division of Ser. No. 354,241, Mar. 3, 1982, Pat. No. 4,458,839.

[51] Int. Cl.⁴ .............................................. F17D 3/01
[52] U.S. Cl. ..................................... 137/551; 374/147
[58] Field of Search ......................... 236/94; 137/551; 374/147, 148

[56] References Cited

U.S. PATENT DOCUMENTS

| | | | |
|---|---|---|---|
| D. 146,308 | 2/1947 | Harman | D91/1 |
| Re. 218,873 | 8/1941 | Hermann | 236/12.17 |
| 899,201 | 9/1908 | Braybrook | 374/147 X |
| 1,384,132 | 7/1921 | Holm | 374/147 X |
| 1,397,720 | 11/1921 | Campbell | 374/148 |
| 1,996,330 | 4/1935 | Goshaw | 236/12.15 |
| 2,102,011 | 12/1937 | Kysor | 236/12.17 |
| 2,122,600 | 7/1938 | Young | 236/12.15 |
| 2,171,992 | 9/1939 | Rantine | 374/148 X |
| 2,244,759 | 6/1941 | Bogardus | 251/96 |
| 2,267,976 | 12/1941 | Hermann | 236/12.18 |
| 2,289,908 | 7/1942 | Gorton | 374/149 |
| 2,517,056 | 8/1950 | Trubert | 236/12 |
| 2,603,091 | 7/1952 | Lamb | 73/343 |
| 2,609,146 | 9/1952 | Heikes | 236/12 |
| 2,648,226 | 8/1953 | Finch | 73/343 |
| 2,657,860 | 11/1953 | Schmidt et al. | 236/12.2 |
| 3,004,710 | 10/1961 | Couffer, Jr. et al. | 236/12 |
| 3,028,094 | 4/1962 | Burhop | 236/12 |
| 3,044,707 | 7/1962 | Bayer | 236/12.2 |
| 3,338,516 | 8/1967 | Parr | 236/12 |
| 3,352,489 | 11/1967 | Coulumbe et al. | 236/12.11 |
| 3,388,861 | 6/1968 | Harding | 236/12 |
| 3,540,650 | 11/1970 | Boekelman et al. | 236/12 |

(List continued on next page.)

FOREIGN PATENT DOCUMENTS

| | | |
|---|---|---|
| 1241212 | 5/1967 | Fed. Rep. of Germany . |
| 3045531 | 1/1982 | Fed. Rep. of Germany . |
| 725762 | 5/1932 | France .................................. 137/551 |
| 48-88673 | 10/1973 | Japan . |
| 57-3177 | 1/1982 | Japan . |
| 157289 | 9/1932 | Switzerland .......................... 137/551 |
| 27652 | 12/1904 | United Kingdom ................. 137/551 |

OTHER PUBLICATIONS

Abstract of French Pat. No. 2,485,772 to Perkins in BOPI No. 53-1981, p. 10193.
Abstract of French Pat. No. 2,458,062 to Valentin, SA in BOPI No. 5-1981, p. 860.

Primary Examiner—William E. Tapolcai
Attorney, Agent, or Firm—Steven L. Permut; Malcolm L. Sutherland; Leon E. Redman

[57] ABSTRACT

A valve assembly comprising a temperature responsive servomechanism adapted to combine hot and cold water under pressure to produce a constant preselected temperature of water at an outlet.

The valve assembly comprises a housing having a valving cavity, a hot water inlet leading to the valving cavity, a cold water inlet leading to the valving cavity, and a mixed water outlet passageway leading from the valving cavity. A valve member translates in the valving cavity and divides the cavity into two auxiliary chambers. A passageway through the valve member allows fluid to flow from each of the inlets to the outlet passageway at a rate that varies as the valve member translates. Passageways in the valve member permit a portion of the mixed water to flow into the auxiliary chambers. An auxiliary passageway is provided between each of the auxiliary chambers and the outlet passageway. A temperature responsive element is provided within the outlet passageway. In response to a deviation in the temperature of water in the mixing chamber the temperature responsive element closes one of the auxiliary passageways causing the valve member to translate until the water in the outlet passageway reaches the preselected temperature.

11 Claims, 38 Drawing Figures

U.S. PATENT DOCUMENTS

| | | | |
|---|---|---|---|
| 3,542,042 | 11/1970 | Buechner | 137/551 X |
| 3,559,885 | 2/1971 | Boekelman et al. | 236/93 R |
| 3,584,784 | 6/1971 | Burhop | 236/12.2 |
| 3,685,728 | 8/1972 | Chapou | 236/12.2 |
| 3,701,472 | 10/1972 | Eklund | 236/102 |
| 3,717,301 | 2/1973 | McIntosh | 251/38 |
| 3,758,028 | 9/1973 | Lange | 137/607 |
| 3,765,604 | 10/1973 | Trubert et al. | 236/100 |
| 3,913,830 | 10/1975 | King | 236/12 |
| 3,952,594 | 4/1976 | McMahan | 374/147 |
| 3,960,016 | 6/1976 | Symmons | 236/94 |
| 4,029,256 | 6/1977 | Dauga | 236/12 R |
| 4,121,761 | 10/1978 | Nolden | 236/12.2 |
| 4,181,252 | 1/1980 | Nolden | 236/12.2 |
| 4,185,771 | 1/1980 | Killias | 236/12 |
| 4,241,868 | 12/1980 | Perkins | 236/94 |
| 4,281,543 | 8/1981 | Ray | 374/147 |
| 4,286,749 | 9/1981 | Oguma | 137/111 |
| 4,299,354 | 11/1981 | Ketley | 236/12.11 |
| 4,575,262 | 3/1986 | Anderson | 374/147 |

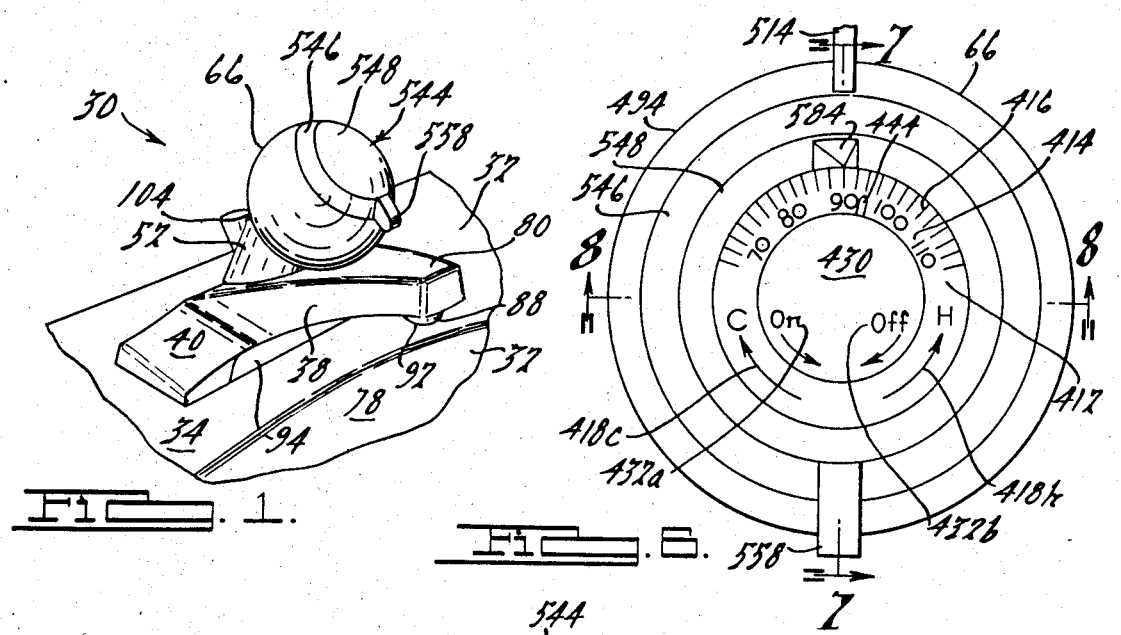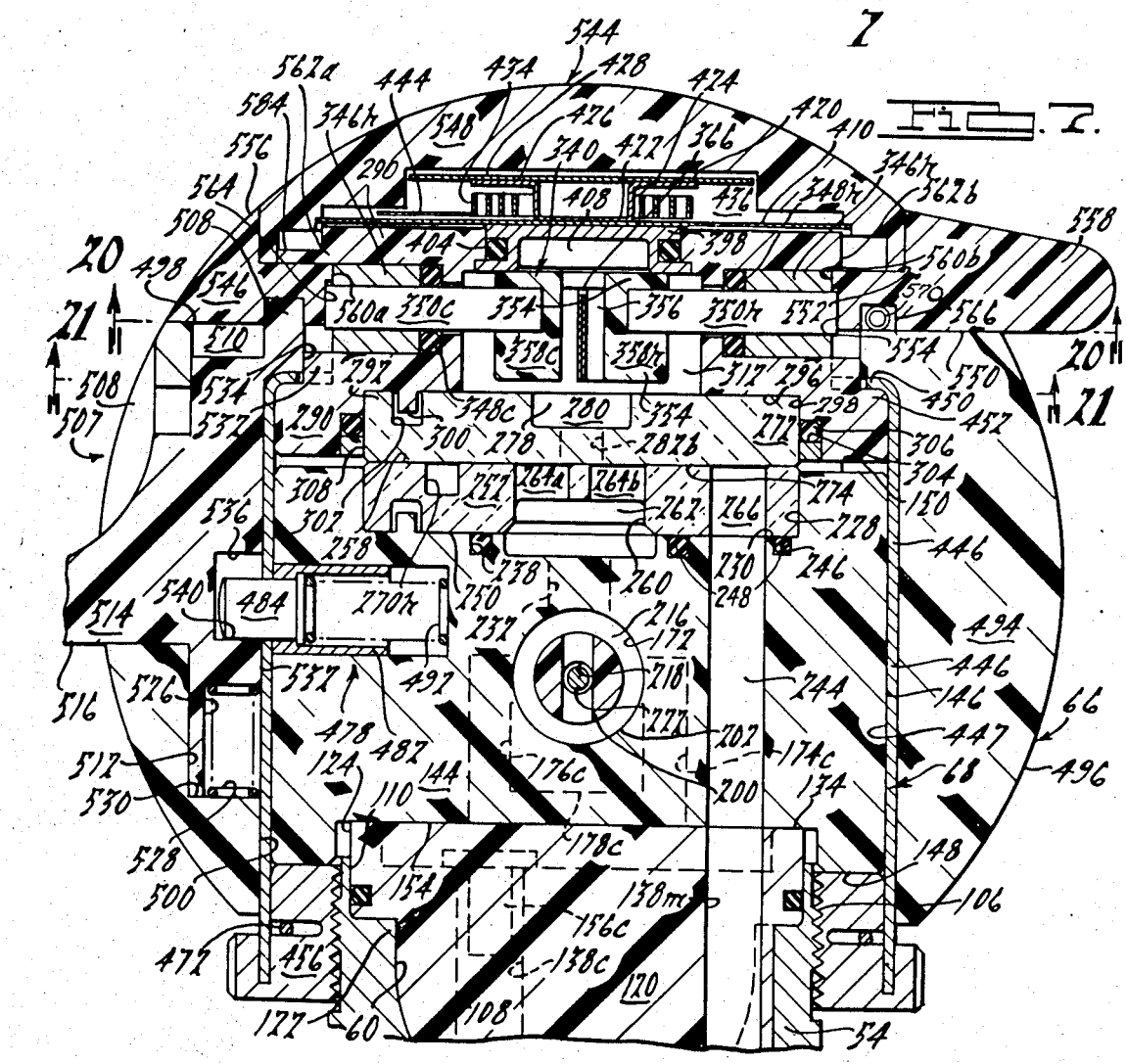

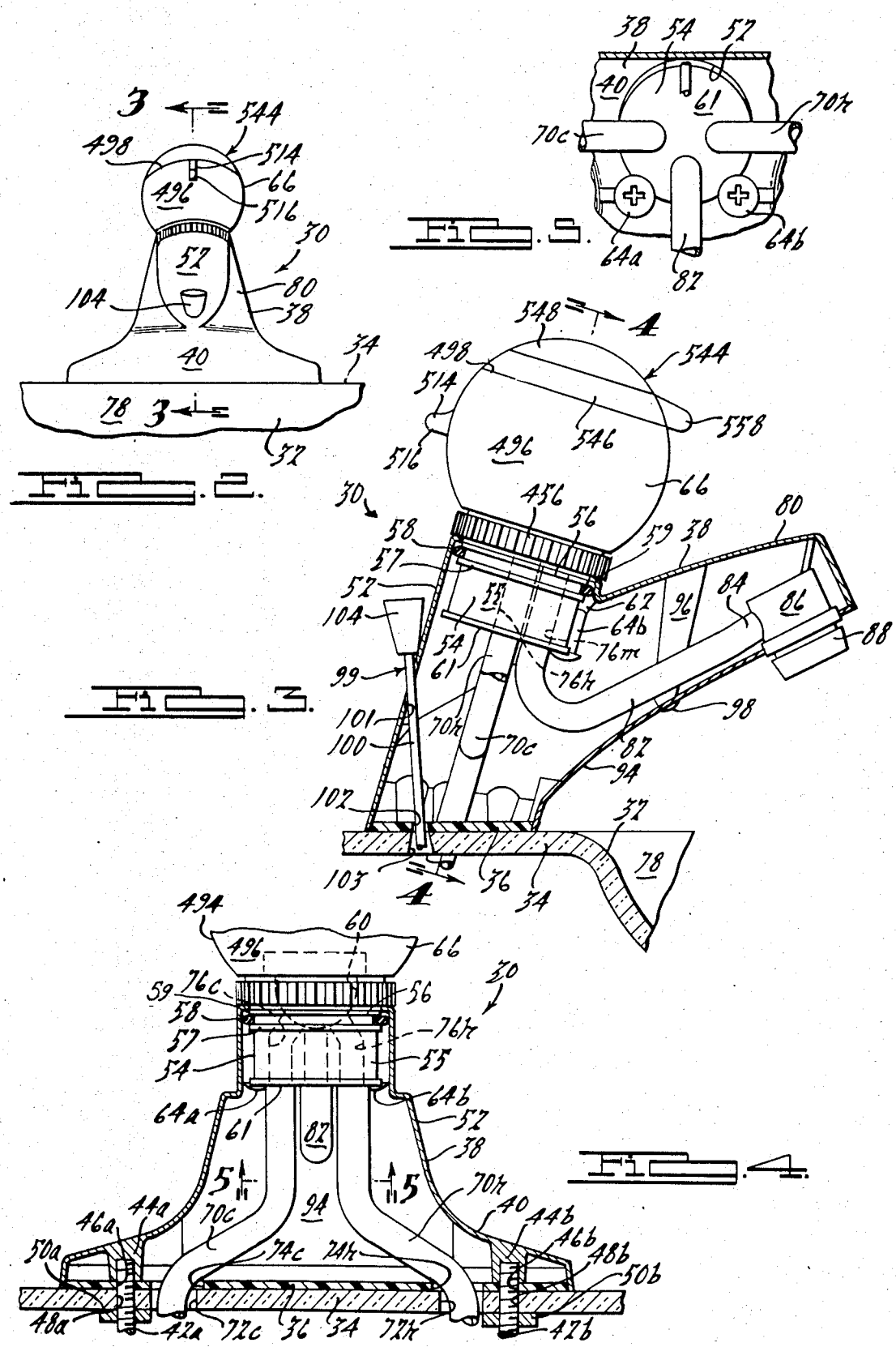

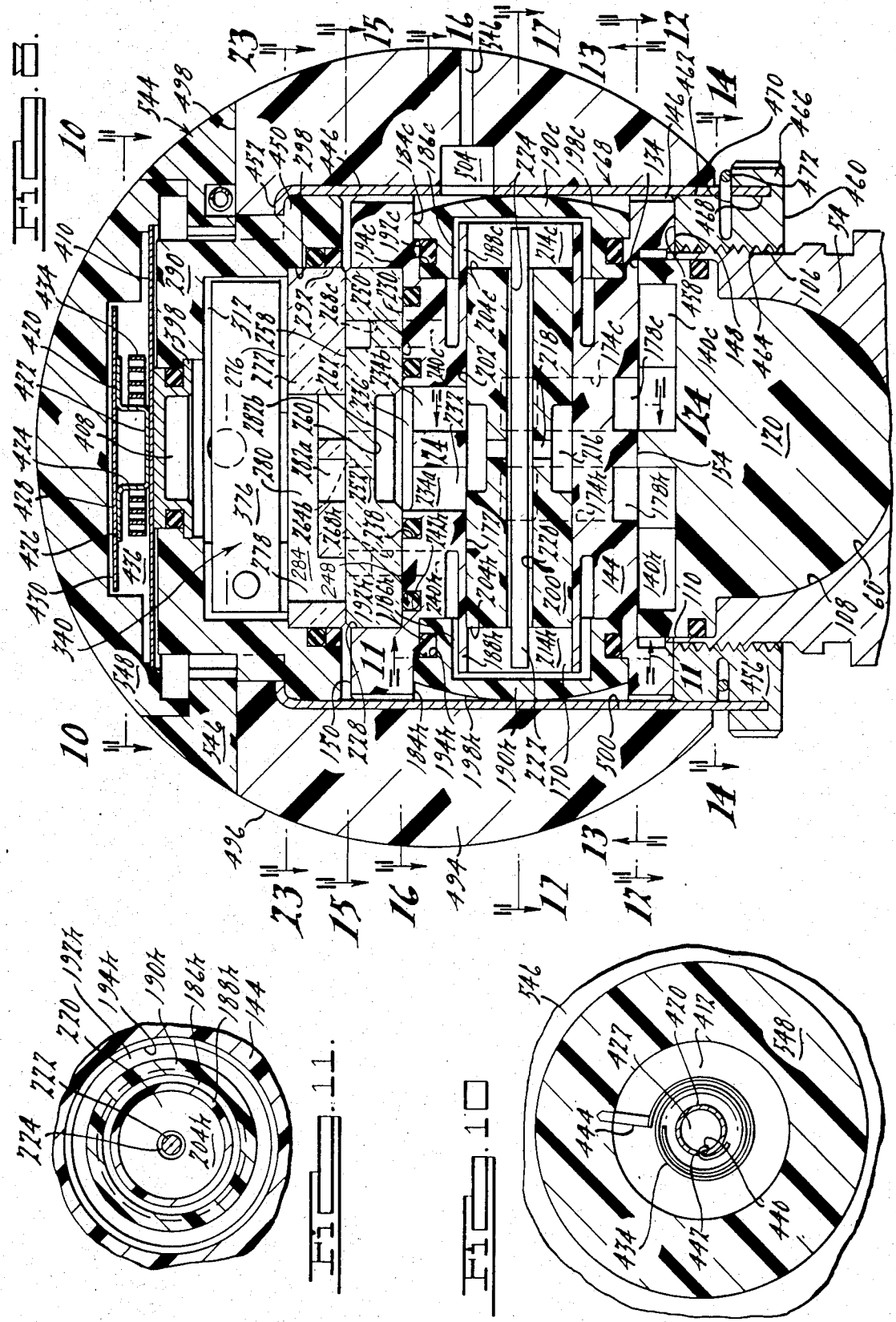

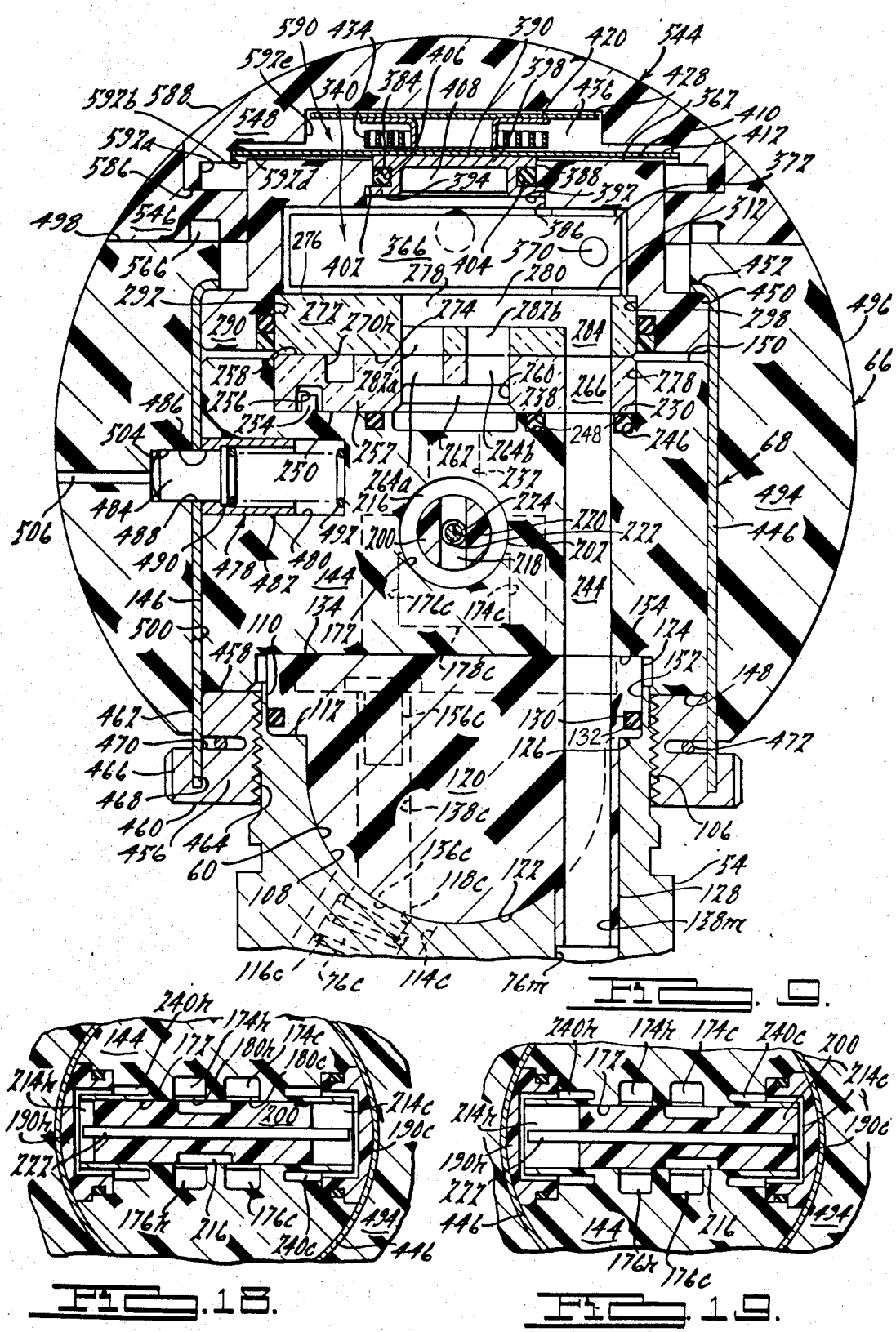

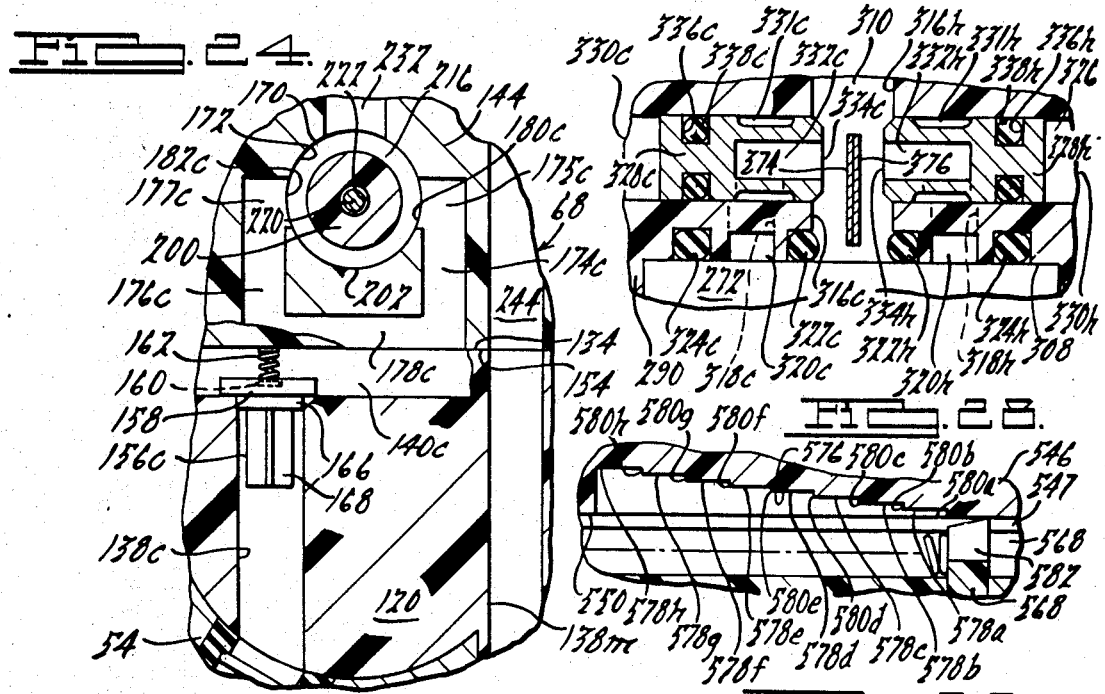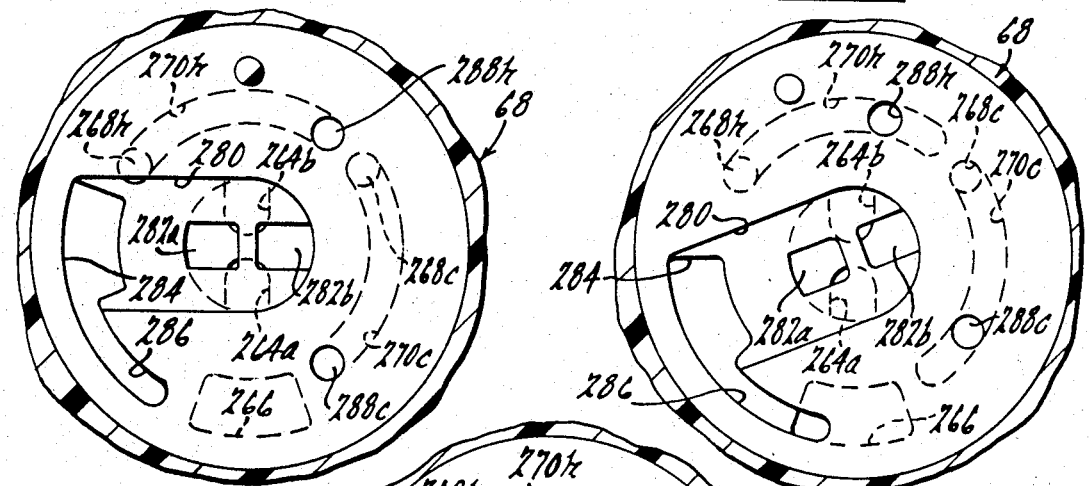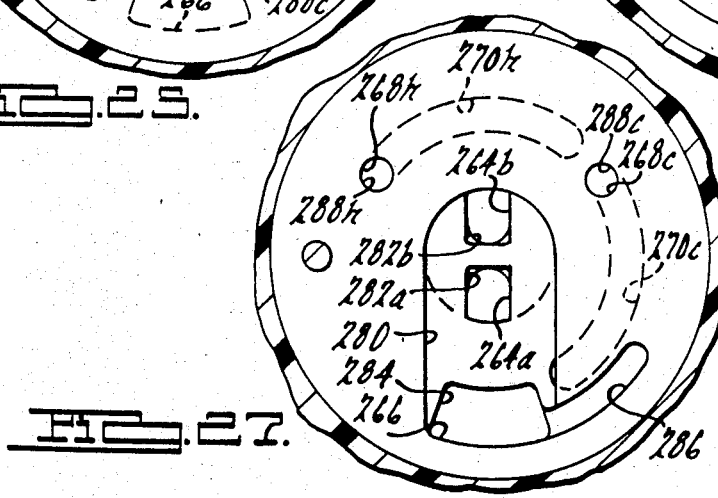

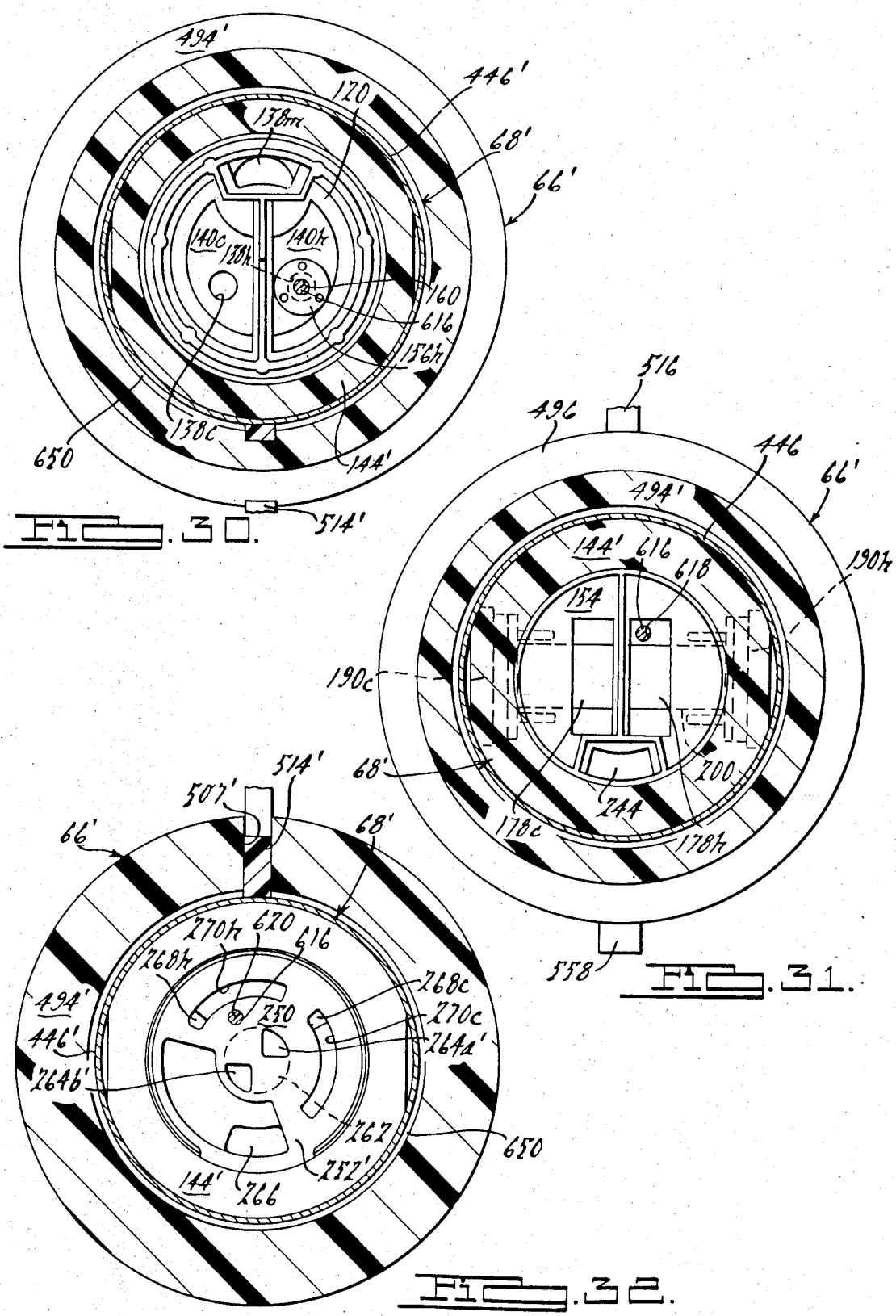

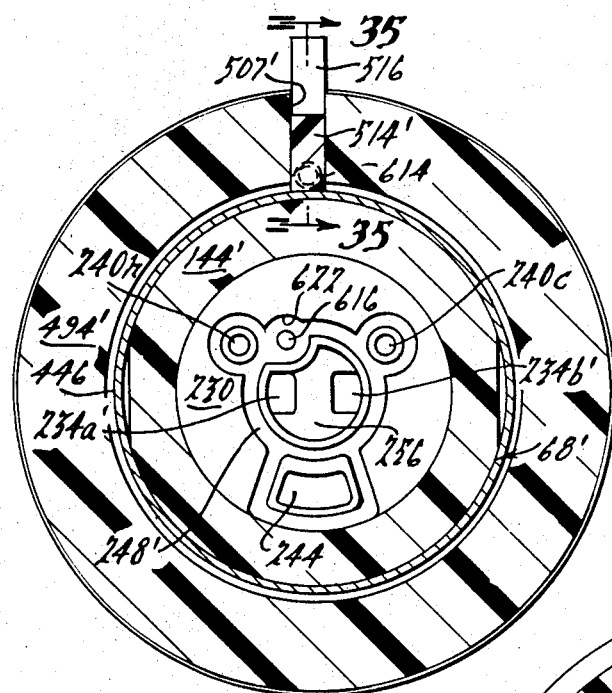
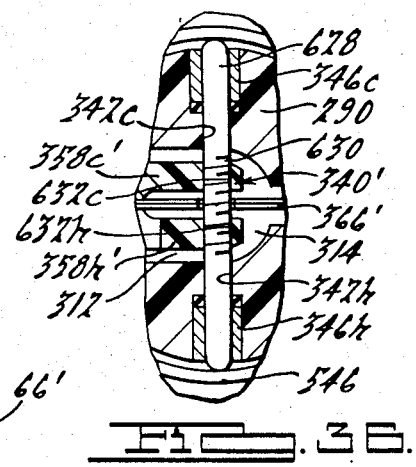
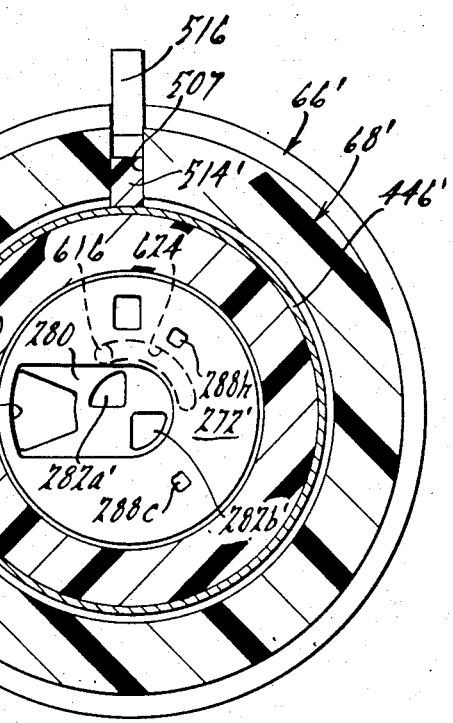
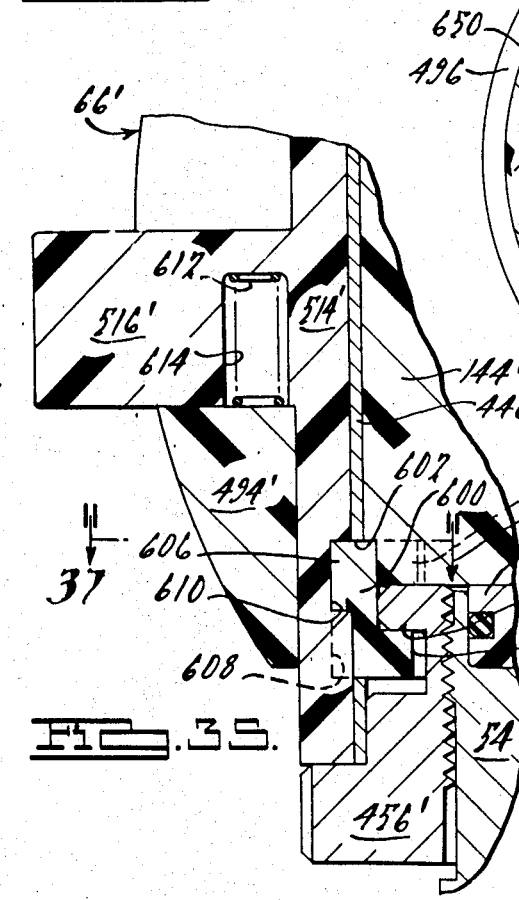
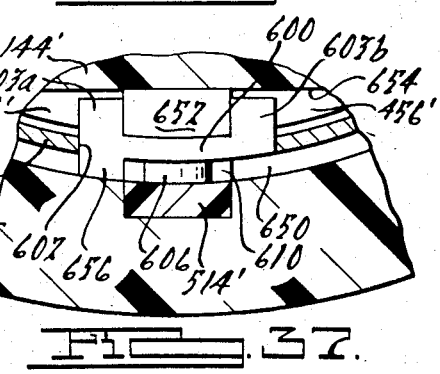

HANDLE VALVE ASSEMBLY

This is a continuation of application Ser. No. 583,758, filed Feb. 27, 1984, now U.S. Pat. No. 4,640,457, which is a divisional of application Ser. No. 354,241 filed Mar. 3, 1982, now U.S. Pat. No. 4,458,839 issued July 10, 1984.

BACKGROUND

The present invention relates to thermostatically controlled faucets and more particularly to thermostatic faucets operated by temperature responsive feedback controlled servomechanisms.

Since shortly after the time that hot and cold running water first became a common feature of architecture, there has been an awareness of the occasional inconvenience that can result from a sudden undesirable change in temperature or pressure of the pressurized water in either of the lines supplying water to a faucet. In some cases, the resulting change in the temperature of the mixed outlet water can result in discomfort to the user of the faucet. The discomfort can be particularly pronounced when the valve is a shower mixing valve and the user is within the shower stall. A sudden pressure drop in the cold water line, such as that which frequently occurs when a toilet is flushed, will cause a sudden increase in the temperature of the shower water, requiring the user to move quickly away from the stream of water.

Several faucets and mixing valves have been developed in an attempt to reduce or eliminate this problem. They include valves provided with thermometers, thermostats or stop mechanisms.

One design offered in the past as an attempt to ameliorate this problem is the provision of a thermometer in the escutcheon of the faucet to notify the user of the temperature of the water. An example of this type of faucet is disclosed in U.S. Pat. No. 3,960,016 (issued June 1, 1976). The thermometer will warn the user of gradual temperature changes or of changes that occur while the user is not in contact.

A primary feature of the present invention is that it provides a reliable compact thermostatically controlled valve wherein all the valving elements and temperature sensing elements can be provided within a control handle. An advantage of this configuration is that a handle assembly may be adapted to be fitted to existing single handle faucet sockets. Another advantage of this configuration is that it permits easy access to internal valve components for servicing and repair. Another advantage of this configuration is that it permits the use of a temperature indicating element visible on the exterior of the handle to indicate the temperature of the mixed water being discharged by the valve. Still another advantage to this configuration is that it permits providing the control handle with a compact temperature preselection mechanism. Still another advantage to this configuration is that it permits providing the control handle with a selectively disengagable stop mechanism limiting the maximum hot water temperature setting to prevent the user from unintentionally preselecting a temperature greater than a predetermined maximum temperature.

Another feature of the present invention is that it provides a servomechanism valve having a movable proportioning valve which is not affected directly by changes in pressure in either of the supply lines, but instead is affected only by the temperature of the mixed water. The advantage to this design is that the valve will produce a more nearly isothermal output than previous servomechanism valves.

It is therefore one object of the present invention to provide a reliable thermostatically controlled valve using a feedback controlled servomechanism.

Another object of the present invention is to provide a compact thermostatically controlled valve that may be mounted within the control handle of a faucet.

A third object of the present invention is to provide a handle module which contains a thermostatic valve assembly and which may be easily adapted to be fitted to the socket of an existing single handled faucet, the module replacing the control handle and some adjacent hardware of the existing faucet.

Another object of the present invention is to provide a thermostatically controlled proportioning valve that will produce an isothermal output even under extreme variations in temperature and pressure in the supply lines.

Another object of the present invention is to provide a single handle faucet having a temperature indicator mounted to the handle.

Another object of the present invention is to provide a servomechanism valve assembly having long and narrow fluid passageways which valve assembly is not susceptible to failure due to the accumulation of particles along the passageways.

Still another object of the present invention is to provide a thermostatically controlled faucet having a selectively disengagable stop mechanism limiting the maximum hot water temperature setting.

Still another object of the present invention is to provide a thermostatically controlled faucet with a restore mechanism to reset the thermostat to a temperature at or below a predetermined maximum level when the faucet is not in operation.

Still another object of the present invention is to provide a faucet having a control handle regulating the total discharge rate of water from the faucet, a thermostatically controlled valve, a temperature indicator, and a selectively disengagable stop limiting the maximum hot water temperature setting wherein the valve, the indicator and the stop are each mounted within the control handle.

SUMMARY

The present invention provides a self-regulating valve assembly for combining pressurized hot and cold water to produce an output of mixed water having a preselected constant water temperature.

The valve assembly has a housing having hot and cold water input passageways. Each of the passageways is capable of being interconnected with a pressurized source of hot water or cold water. Each of the input passages communicates with a valving cavity in the housing through openings in a wall thereof. A water discharge passageway is formed in the housing and leads from the valving cavity to a water discharge port. A proportioning valve member is located within the valving cavity and is selectively movable therein to regulate the relative flow rate of hot and cold water from the input passageways to the discharge passageway. A seal is provided between the valve member and the valving cavity whereby the valving cavity is divided into two auxiliary chambers by the valve member. A narrow water passageway through the valve member is provided between an upstream portion of the discharge passageway and each auxiliary chamber. Two narrow auxiliary water passageways are provided in the housing leading from each of the auxiliary chambers to one of two orifices in a downstream portion of the discharge passageway.

The valve assembly further has a temperature responsive servomechanism sensing the temperature of the water in the discharge passageway and automatically moving the proportioning valve member to a new position within the valving cavity to adjust the relative flow rate of hot and cold water and, thus, to produce a preselected discharge water temperature. The servomechanism is characterized by temperature sensing element disposed within the discharge passageway between the orifices of the auxiliary passageways into the discharge passageways. In response to a deviation in the temperature of the water in the discharge passageway from the preselected temperature, the temperature sensing element moves to cover one of the orifices, and thereby causes a temporary increase in pressure in the auxiliary chamber corresponding to the covered orifice. The increase in pressure in one of the auxiliary chambers causes the proportioning valve member to move towards the other auxiliary chamber and thus changes the relative flow rates of hot and cold water into the discharge passageway. When the temperature of water in the mixing chamber reaches the preselected temperature, the temperature sensing element is restored to a neutral position and the proportioning valve stops moving.

In the preferred embodiment, the present invention provides a faucet having a housing capable of being mounted to the rim of a basin or to a wall and having a combined volumetric flow rate control handle mounted to the housing. The handle of the faucet of the preferred embodiment further has a feedback servomechanism thermostatic valve mounted therein. In addition, an adjustment mechanism for presetting the thermostatic valve to a desired temperature, a selectively disengagable stop mechanism limited the maximum preset temperature and a temperature indicator are all provided and are mounted to the handle.

BRIEF DESCRIPTION OF THE DRAWING

FIG. 2 is a rear elevational view of the faucet of FIG. 1;

FIG. 3 is a side elevational view of the faucet taken along line 3—3 of FIG. 2 with some parts cut away;

FIG. 4 is a partially elevational view of the faucet, partly in section and taken along line 4—4 of FIG. 3;

FIG. 5 is a partial sectional view of the faucet taken along line 5—5 of FIG. 4;

FIG. 6 is a top view of the handle assembly of the faucet of FIG. 1;

FIGS. 7 and 8 are sectional views of the handle assembly and a portion of the socket body of the faucet taken along lines 7—7 and 8—8, respectively, of FIG. 6, and illustrate the handle assembly in an orientation wherein the valve assembly is in its fully closed position;

FIG. 9 is a partial sectional view similar to FIG. 7, but illustrating the handle assembly in an orientation wherein the valve assembly is in its fully opened position;

FIG. 10 is a partial sectional view taken along line 10—10 of FIG. 8, and illustrates a portion of the cap assembly and a portion of the bimetallic coil thermometer;

FIG. 11 is a sectional view taken along line 11—11 of FIG. 8, and illustrates a portion of the lower main body and adjacent elements;

FIG. 15 is a sectional view taken along line 15—15 of FIG. 8, and illustrates the lower ceramic disk and adjacent elements;

FIG. 16 is a sectional view taken along line 16—16 of FIG. 8, and illustrates the upper portion of the lower main body and adjacent elements;

FIGS. 18 and 19 are partial sectional views similar to FIG. 17 wherein the spool is in alternative positions;

FIG. 24 is a partial sectional view taken along line 24—24 of FIG. 8, and illustrates the valve assembly to prevent back flow;

FIG. 25 is a partial sectional view similar to FIG. 23, but showing the valves associated with the disks in the fully closed positions;

FIG. 26 is a view similar to FIG. 25, but showing the valves in the partly opened position;

FIG. 27 is a view similar to FIGS. 25 and 26, but showing the valves in the fully opened position;

FIG. 28 is a partial sectional view taken along line 28—28 of FIG. 20, and illustrates the nozzle assemblies;

FIG. 29 is a partial sectional view taken along line 29—29 of FIG. 23, and illustrates the stop lever and a portion of the ornamental shell;

FIGS. 30, 31, 32, 33 and 34 are a views similar to FIGS. 12, 13, 15, 16 and 23, respectively, but illustrate a valve assembly incorporating several modifications;

FIG. 35 is a sectional view taken along line 35—35 of FIG. 33;

FIG. 36 is a partial view similar to a portion of FIG. 20 and illustrates a modified temperature responsive mechanism; and FIG. 37 is a sectional view taken along line 37—37 of FIG. 35.

DETAILED DESCRIPTION OF THE PREFERRED EMBODIMENT

Figure 12:
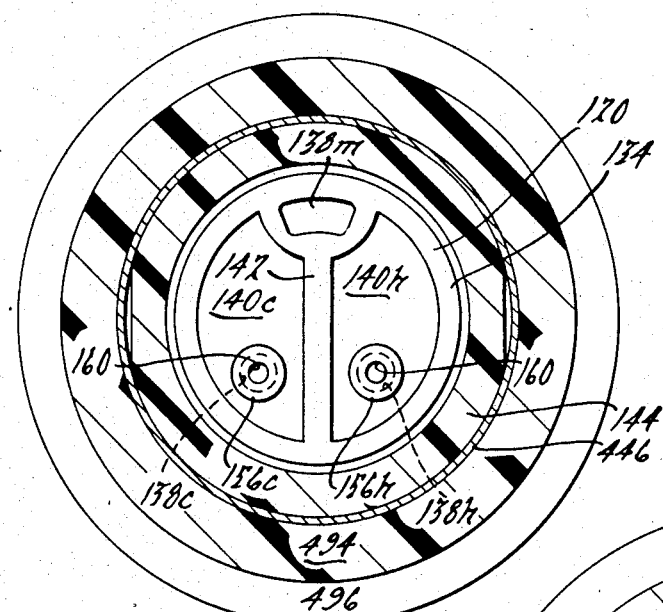
FIG. 12 is a sectional view taken along line 12—12 of FIG. 8, and illustrates the adapter plug and adjacent elements.

The present invention comprises a valve assembly for regulating the relative discharge rates of water from supply lines containing hot and cold water under pressure. The drawing depicts the construction and features of the preferred embodiment of a faucet 30 (FIG. 1) using a valve assembly in accordance with the present invention. The many objects and advantages of the present invention will become apparent to those skilled in the art when the following detailed description is read together with the drawing.

Due to the large number of elements associated with the preferred embodiment of the present invention and due to its relative complexity, the detailed description is divided into several sections. The first section describes the structure of each of the elements and the physical relationships between the elements in the assembled faucet 30. The second section describes the path taken by the water through the faucet 30 and describes the function of the elements of the faucet. The third section describes alternatives, variations and modifications from the preferred embodiment.

Throughout the following detailed description, like reference numerals refer to like elements. For convenience, the small letters h, c and m have been added to several of the reference numerals referring to similar passageways for hot, cold and mixed water, respectively. The letters h and c are also used to refer to identical elements associated with the regulation of the flow rates of hot and cold water, respectively. The small letters a, b and d are added to reference numerals to indicate that two or more elements are identical to each other or symmetrical with respect to each other but are not individually associated with the regulation of hot or cold water flow rates.

1. Elements of the Preferred Emodiment

Figure 1S:
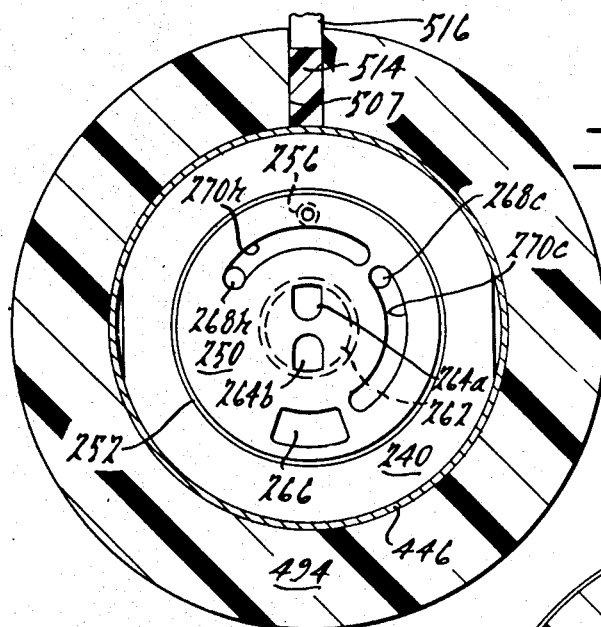
FIG. 1 is a perspective view of a faucet having a thermostatic servomechanism valve according to the present invention, the faucet being shown mounted on the rim of a sink.
Figure 1B:
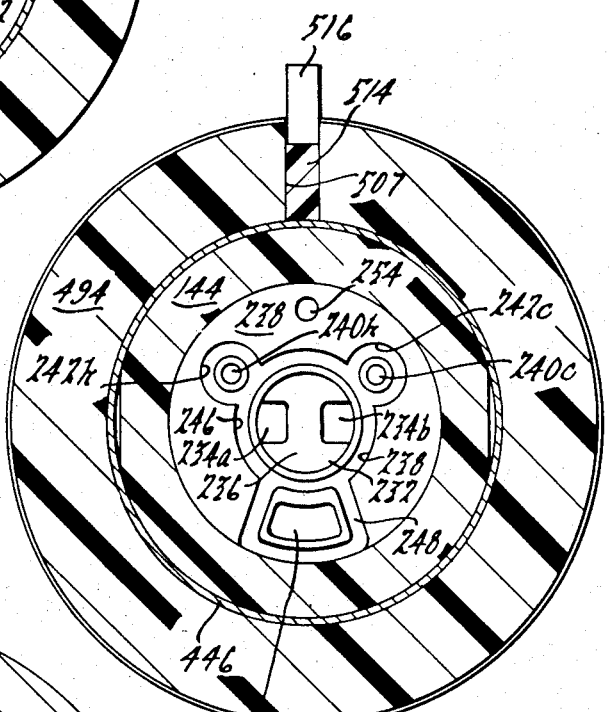

Referring now to the drawing, FIGS. 1 through 4 illustrate a faucet 30 of the type used to mix pressurized hot and cold water and to discharge mixed water of a predetermined constant temperature into a sink 32 (FIGS. 1 and 2). The faucet 30 has a flat base plate 36 resting on the rim 34 of the sink 32 (FIGS. 3 and 4). The faucet 30 further has a hollow housing 38 that includes an escutcheon 40 resting on the plate 36. A pair of bolts 42a and 42b (FIG. 4) extend downwardly from a corresponding pair of internally threaded bosses 44a and 44b extending from the lower side of the escutcheon 40. The bolts 42a and 42b pass downwardly through apertures 46a and 46b in the base plate 36 and through apertures 48a and 48b in the rim 34 of the sink 36 and are fastened to the rim 34 by means of nuts 50a and 50b, respectively.

A hollow cylindrical column 52 is formed integrally as a part of the housing 38 and extends upwardly from the escutcheon 40. A socket body 54 (FIGS. 3 and 4) having a cylindrical outer surface 55 is partly located within the column 52. The socket body is provided with a pair of parallel circular ribs 56 and 57 disposed around the outer surface 55. An O-ring 58 is fitted around the surface 55 between the ribs 56 and 57. The column 52 has a flange 59 at its uppermost portion that limits the upward movement of the socket body 54. The socket body 54 also has a socket cavity 60 in its upper surface and a flat bottom surface 61. The upper portion of the socket body 54 extends upwardly from the column 52 and will be described in great detail later.

Each of a pair or internally threaded bosses, one of which is shown at 62 in FIG. 3, extends downwardly from the underside of the housing 38 near the lower portion of the cylindrical outer surface 55 of the socket body 54. The socket body 54 is fastened to the housing 38 by means of a pair of large headed screws 64a and 64b (FIGS. 4 and 5), each of which is threaded into one of the internally threaded bosses 62a and 62b. The heads of the screws 64a and 64b rests against the lower surface 61 of the socket body 54 and raise the socket body until the upper circular, rib 56 abuts the flange 59.

A handle assembly 66 is mounted to the end of the socket body 54 having the socket cavity 60. All of the valving that is necessary to regulate the total flow rate and the temperature of the water discharged by the faucet 30 occurs in a valve assembly 68 (FIGS. 7, 8 and 9) contained within the handle assembly 66. The handle assembly 66 and the valve assembly 68 will be described individually in great detail later.

A hot water supply line 70h and a cold water supply line 70c are provided as shown in FIG. 4. Each of the supply lines 70h and 70c is interconnected at one of its ends to a source, not shown, of pressurized hot or cold water below the sink. Each of the supply lines 70h and 70c extends upwardly into the hollow interior or the housing 38 through apertures 72h and 72c in the rim 34 of the sink 32 and through apertures 74h and 74c in the base plate 36. Passageways 76h and 76c are provided vertically through the socket body 54 extending from the lower surface 61 of the socket body to the socket 60. Each of the supply lines 70h and 70c is fastened at the other of its ends to the lower surface 61 of the socket body 54 and is interconnected with one of the passageways 76h or 76c in the socket body.

The housing 38 of the faucet 30 further includes a hollow spout 80 (FIG. 3) extending from the escutcheon 40 to a position over the basin 78 of the sink 32. An outlet water line 82 is fastened to the lower surface 61 of the socket body 54 and is interconnected with a passageway 76m in the socket body 54. The passageway 76m extends vertically through the socket body 54 from the lower surface 61 to the socket 60. The outlet water line 82 extends from the socket body 54 through the hollow spout 80 and is interconnected at its end 84 that is farthest from the socket body 54 with a fitting 86 located at the end of the spout. An aerator 88 is interconnected with the fitting 86 and extends downwardly from the end of the spout 80. The aerator 88 may be provided with a metallic latticework filter, now shown, covering an outlet 92 of the aerator.

A removable cover plate 94 is provided on the lower side of the faucet 30 to permit access to the interior of the faucet 30 for repair and maintenance and to aesthetically complete the lower portion of the faucet. The plate 94 is fastened to the housing 38 by means of a pair of screws 98, only one of which is shown in FIG. 3, that pass through apertures in the plate 94 and are threaded into internally threaded bosses 96 extending from the lower side of the spout 80.

A drain stopper control 99 is mounted to the housing 38 of the faucet 30. The drain stopper control 99 has a shaft 100 that passes downwardly from above the cylindrical column 52 through an aperture 101 in the housing 38, an aperture 102 in the base plate 36 and an aperture 103 in the rim 34 of the sink 32. The stopper control 99 also has a knob 104 on the uppermost end of the shaft 100. A lever mechanism, not shown in the drawing, is provided under the sink 32 to reciprocate a drain stopper, also not shown in the drawing, in the lower portion of basin 78 of the sink 32. The drain stopper and lever mechanism are both well known in the art.

Refer now to FIG. 9 wherein additional structure of the socket body 54 may be seen. In the preferred embodiment and as illustrated in the drawing, the socket body 54 is similar to the valve body of the single handled faucet disclosed in U.S. Pat. No. 3,056,418 (Issued Oct. 2, 1962), the disclosure of which is hereby incorporated by reference. The valve body of the single handled faucet disclosed therein is best seen in FIGS. 1 and 2 thereof and is indicated therein by the reference numeral 12. When the valve body is used as described in the '418 patent, the socket cavity in the upper surface of the valve body accepts a spherical valve member. A hemispherical cover is threaded onto the valve body to cover and seal the valve member. A handle extends through an aperture in the cover and permits manipulation of the valve member to regulate the temperature of the combined volumetric flow rate of the water discharged from the valve body. When the valve body is used as a socket body for a valve assembly according to the present invention the spherical valve member, the cover and the handle of the '418 patent are not used.

Figure 14:
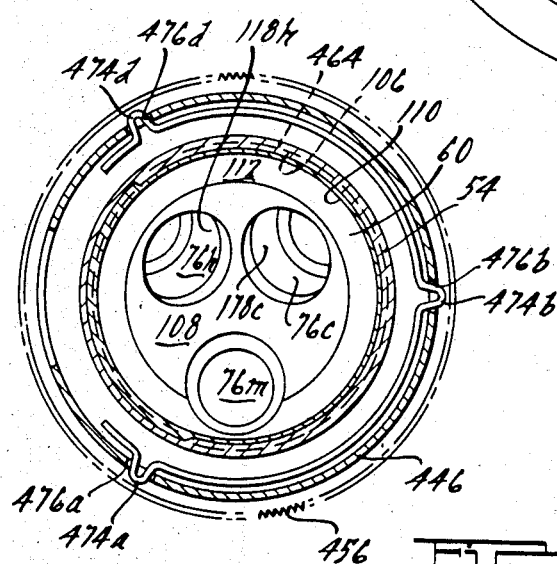
FIG. 14 is a sectional view taken along line 14—14 of FIG. 8 showing the upper portion of the socket body with the adapter plug removed.

The socket body 54 is usually a metallic casting and is provided with an external thread 106 around the uppermost portion of the cylindrical surface 55. The thread 106 is used for the attachment of the hemispherical cover in the '418 patent but is used herein for attachment of handle assembly 66. The socket cavity 60 has a hemispherical portion 108 and a cylindrical portion 110. The cylindrical portion 110 has a larger diameter than the hemispherical portion 108 and defines a shoulder 112 therebetween. As best seen in FIG. 14, the passageways 76h, 76c and 76m have openings into the hemispherical portion 108 of the socket cavity 60. As shown in FIG. 9, a counterbore 114c is provided in the surface of the portion 108 into the passageways 76c. A spring 116c is set into the counterbores 114c. A toroidal valve seat 118c is placed in each counterbore over the spring 116c to form a watertight seal between the socket body 54 and the valve assembly 68. The passageway 76h is provided with a similar counterbore and spring, not shown in the drawing, and a similar valve seat, illustrated at 118h in FIG. 14.

As best seen in FIG. 9, the valve assembly 68 includes an adapter plug 120 that is inserted into the socket cavity 60 of the socket body 54. The adapter plug 120 may be formed of plastic or any other suitable material. The adapter plug 120 has a hemispherical portion 122 fitted into the hemispherical portion 108 of the socket cavity 60 and has an enlarged cylindrical portion 124 inserted into the cylindrical portion 110 of the socket cavity 60. An annular shoulder 126 is formed between the portions 122 and 124 of the adapter plug 120 and is located spacially above the shoulder 112 of the socket cavity 60 so that the hemispherical portion 122 will rest securely against the seats 118h and 118c. A cylindrical extension 128 of the adapter plug 120 extends vertically downwardly from the hemispherical portion 122 and is inserted through the center of the mixed water passageway 76m. The extension 128 aligns the adapter plug 120 with the socket body 54. An O-ring 130 is provided in an annular groove 132 around the cylindrical portion 124 of the adapter plug 120 to form an additional watertight seal between the adapter plug 120 and the socket body 54.

As best seen in FIG. 12, three vertical water passageways 138m, 138h and 138c are provided through the adapter plug 120 from the surface of the hemispherical portion 122 of the adapter plug 120 to a flat top surface 134 of the cylindrical portion 124 of the adapter plug. As seen in FIG. 9, one of the passageways provided through the adapter plug 120, the mixed water passageway 138m, extends partly through the center of the extension 128. Another passageway, cold water passageway 138c, has an opening 136c in the hemispherical portion 122 of the adapter plug 120. The opening 136c is centered over the cold water passageway 76c, of the socket body 54. The spring loaded seat 118c forms a watertight seal between the adapter plug 120 and the socket body 54 around the opening 136c. Similarly, the third passageway, the hot water passageway 138h, has an opening, not shown in the drawing, in the hemispherical portion 122 centered over the hot water passageway 70h of the socket, and is sealed against leakage by the seat 118h.

As seen in FIG. 12, two shallow pie-shaped cavities 140h and 140c are provided in the top surface 134 of the adapter plug 120. The cavities 140h and 140c are separated from each other and from the mixed water passageway 138m by a wall 142. The upper ends of the passageways 138h and 138c are open into the cavities 140h and 140c, respectively.

The valve assembly 68 further includes a lower main body 144 (FIG. 9) located above the adapter plug 120. The lower main body 144 is substantially a cylindrical element having a cylindrical outer surface 146, a flat base 148 and a flat upper surface 150. A shallow circular recess 152 is provided in the base 148 and defines a flat horizontal lower surface 154. The inner diameter of the circular recess 152 is larger than the outer diameter of the cylindrical portion 124 of the adapter plug 120 so that the portion 124 rests partially within the recess 152. Preferably, the adapter plug 120 and the lower main body 144 are both comprised of plastic and the lower surface 154 is heat sealed to the top surface 134 of the adapter plug 120. Other details of the lower main body 144 will be described shortly.

Check valves 156h and 156c (FIG. 12) are provided between the adapter plug 120 and the lower main body 144 for closing the passageways 138h and 138c, respectively. As shown in FIG. 24 for check valve 156c, each check valve has a cylindrical head portion 158 having a diameter larger than the diameter of the passageways 138h and 138c. An aperture 160 is provided in each head portion 158 accepting one end of a compression coil spring 162. The other end of each of the springs 162 is inserted into one of the two apertures 164h and 164c (FIG. 13) in the recessed surface 154 of the lower main body 144. A cylindrical neck portion is provided below each of the head portions 158 and has an outer diameter substantially smaller than the inner diameter of the passageways 138h and 138c. An O-ring 166 is fitted onto the neck portion of each check valve 156h or 156c. The combined height of the head portion 158 and the O-ring 166 of each of the valves 156h and 156c is less than the depth of the cavities 140h and 140c. A stem portion 168 extends downwardly from each of the neck portions and reciprocate within the corresponding passageway 138h and 138c. Each stem portion 168 consists of three vertical flat rectangular portions extending radially from the longitudinal axis of the valve.

The springs 162 bias the check valves 156h and 156c downwardly to close the openings of the passageway 138h and 138c. The pressurized water in the passageways 138h and 138c acts against the force of the springs 162h and 162c to raise the check valves 156h and 156c. When the check valves 156h and 156c are in the raised positions, the water may flow past the check valves into the cavities 140h and 140c. When the pressure along one of the supply lines drops below a predetermined valve, however, the corresponding valve closes to prevent back flow. For example, when the hot water pressure drops, the spring 162h lowers the valve 156h and prevents the flow of mixed water from the valve assembly 68 through the passageway 138h to the hot water supply line 70h.

The details of the lower main body 144 are best understood by referring to FIGS. 7, 8, 9 and 13. A valving cavity 170 (FIG. 8) is provided in the lower main body 144. The valving cavity 170 is a horizontal bore extending radially through the lower main body 144 and has a smooth cylindrical valving surface 172. Four water passageways 174h, 174c, 176h and 176c (FIG. 13) are provided through the lower main body 144 to deliver pressurized water to the valving cavity 170.

As best shown in FIG. 24, two of the passageways, passageways 174c and 176c, are open at their lowermost ends to a common rectangular slot 178c in the surface 154 of the lower main body 144. The slot 178c is located above and is open to the cavity 140c in the top surface of the adapter plug 120. The passageways 174c and 176c are directed upwardly from the slot 178c, one of the passageways being on either side of the valving cavity 170. The upper portion 175c and 177c of the passageways 174c and 176c are directed inwardly towards the longitudinal axis of the valving cavity 170. The upper portions 175c and 177c have openings 180c and 182c, respectively, in the valving surface 172 of the valving cavity 170. The passageways 174c and 176c thereby deliver pressurized cold water from the adapter plug 120 to the valving cavity.

Similarly, a rectangular slot 178h (FIG. 13) in the surface 154 overlies the cavity 140h in the adapter plug 120. The passageways 174h and 174h extend from the slot 178h first upwardly into the lower main body 144 and then radially into the valving cavity 170. The passageways 174h and 176h communicates with the valving cavity 170 through openings 180h and 182h (FIG. 17), respectively, in the valving surface 172. The passageways 174h and 176h thereby deliver pressurized hot water to the valving cavity.

Figure 17:
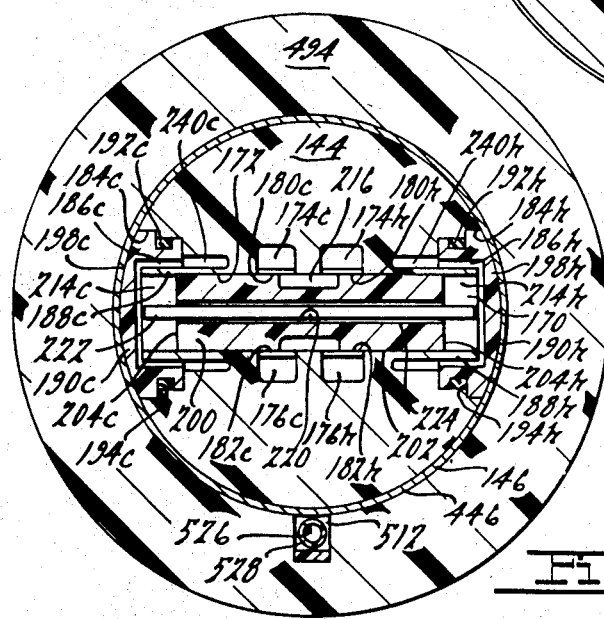
FIG. 17 is a sectional view taken along line 17—17 of FIG. 8 and illustrates the spool and adjacent elements when the spool is in the central position.

As best seen in FIGS. 8 and 17, a large cutaway is provided at each end of the valving cavity 170. Each cutaway consists partly of a counterbore 184h or 184c. Each cutaway further includes an annular portion 186h or 186c around the corresponding end of the valving cavity 170. The annular portions 186h and 186c are separated from the valving cavity 170 by thin cylindrical walls 188h and 188c, respectively. An end cap 190h and 190c is fitted into each of the cutaway portions to seal the corresponding end of the valving cavity 170. Each of the end caps 190h and 190c is provided with an O-ring 192h or 192c fitted into a suitable annular groove 194h or 194c to seal the ends of the valving cavity 170. The exterior surfaces 198h and 198c of each of the end caps 190h and 190c are shown in the drawing to have a spherical curvature. No portion of either of the surfaces 198h and 198c extends beyond the radius of the cylindrical surface 146 of the lower main body 144.

A cylindrical proportioning valve member or spool 200 is slidably disposed within the valving cavity 170. The spool 200 is made of a suitable plastic or metal and has a smooth outer cylindrical surface 202 in contact with the cylindrical valving surface 172 of the valving cavity 170. The surface 202 of the spool 200 and the valving surface 172 of valving cavity 170 should be made to appropriate nominal dimensions and tolerances that will permit at most only a minimal amount of water to pass through the annular region between the surface 202 and the valving surface 172 of the cavity yet will allow the spool 200 to reciprocate relatively freely within the cavity 170. The spool 200 has two flat end faces 204h and 204c. As shown in FIG. 18, the spool 200 divides the valving cavity 170 into two auxiliary chambers 214h and 214c, one located near each of the end faces 204h and 204c of the spool 200.

The spool 200 is provided with an annular groove 216 about its cylindrical outer surface 202 near the middle of the surface 202. The annular groove 216 is the first portion of a mixed water passageway through the faucet 30 that eventually leads to the outlet 92 of the spout 80 (FIG. 3). The groove 216 will always contain pressurized water whether the faucet is being operated or not so long as pressurized water is being supplied to the faucet 30 from both of the supply lines 70h and 70c (FIG. 4). As seen in FiGS. 18 and 19 and as will be described later in detail, valving occurs between the annular groove 216 and the openings 174h, 174c, 176h and 176c when the spool 200 is reciprocated within the valving cavity 170.

Figure 17A:
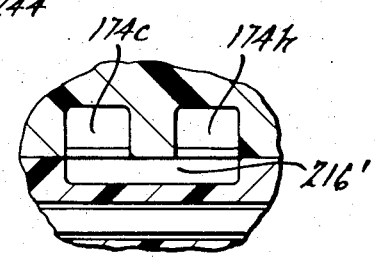
FIG. 17a is a partial sectional view similar to a portion of FIG. 17, but showing a modified spool.

As shown in FIGS. 17, 18 and 19, the annular groove 216 can be designed to provide a nearly constant total flow rate as the spool is shifted by providing a constant total area of the groove 216 open to the openings 174h, 174c, 176h and 176c. This may be preferred when the faucet 30 is used as a lavatory faucet. Alternatively, as shown in FIG. 17a, the annular groove 216 may be sufficiently wide that it will be open completely to all of the openings when the spool is in the central position. This later configuration maximizes the total flow rate of water through the valve assembly 68 for each position of the spool 200. This is particularly preferable to the former configuration when the valve assembly is used as a mixing valve for a tub since the tub will fill up more rapidly using the later configuration.

A radial bore 218, open at each end to the annular groove 216, is provided through the spool 200. A axial bore 220 is also provided through the spool 200, as shown in FIG. 9. A rod 222 has an outer diameter smaller than the inner diameter of the the spool 200. An annular region 224 between the bore 220 and the rod 222 is open to the radial bore 218 through the spool and permits a small percentage of the mixed water from the annular groove 216 to travel to each of the auxiliary chambers 214h and 214c. Therefore, the auxiliary chamber 214h and 214c always contain mixed pressurized water.

The rod 222 is provided in the axial bore 220 for several reasons. The rod 222 reduces the flow rate of water from the groove 216 to the auxiliary chambers 214h and 214c to a sufficiently slow rate to permit a pressure differential between the auxiliary chambers to be maintained temporarily. Furthermore, the rod 222 greatly reduces the size of the largest particle that may travel from the annular groove 216 to the auxiliary chambers 214h and 214c. In the preferred embodiment, the outer diameter of the rod 222 is five thousandths of an inch (0.005") or about one hundred and thirty microns (0.130 mm) less than the inner diameter of the bore 220. Since the rod 222 is suspended by the water in the annular region 224, most particles entering the auxiliary chambers 214h and 214c will have at least one dimension of less than twenty-five ten thousandths of an inch (00025") or about sixth-five microns (0.065 mm) and all particles entering the auxiliary chambers will have at least one dimension less than twice that amount. This is significant since the water that enters the auxiliary chambers 214h and 214c subsequently travels through a control circuit, described later, that has narrow passageways that might become blocked if large particles suspended in the supply water are permitted to flow therethrough. All of the passageways of the control circuit are considerably wider than five ten thousandths of an inch (0.005") or about one hundred and thirty microns (0.130 mm) so that any particle that gets through the annular region 224 will flow through the control circuit. Finally, the rod 222 tends to keep the annular region 224 free of particles since the rod is relatively stationary but the spool 200 shifts back and forth frequently while the faucet 30 is in operation.

As shown in FIGS. 7, 8 and 9, the top surface 150 of the lower main body 144 is provided with a cylindrical recess 228 having a flat upper surface 230. A vertical mixed water passageway 232 is provided between the cylindrical wall 172 of the valving cavity 170 and the flat surface 230 of the recess 228. The passageway 232 is comprised of two short vertical passageways 234a and 234b and a shallow circular cavity 236 in the surface 230, as shown in FIGS. 8 and 16. At least one of the passageways 234a and 234b is open to the annular groove 216 at all times, as best shown in FIG. 8, and thus the passageway 232 always contains pressurized mixed water. A groove 238 is provided in surface 230 and around the cavity 236.

The lower main body 144 is further provided with auxiliary passageways 240h and 240c leading from each of the auxiliary chambers 214h and 214c to the surface 230. The auxiliary passageways 240h and 240c are parts of a control circuit that is described in detail later. Grooves 242h and 242c are provided in the surface 230 around the openings of the passageways 240h and 240c. As shown in FIGS. 9 and 16, an outlet water passageway 244 is also provided through the main body 144. The passageway 244 extends upwardly from an opening in the lower recessed surface 154 and is aligned with the outlet water passageway 138m in the adapter plug 120. The passageway 244 leads to an opening in the upper recessed surface 230. A groove 246 is provided around the opening of the passageway 244 in the surface 230. A gasket 248 is inserted in the cutaway defined by the grooves 238, 242h, 242c and 246 in the top surface 230 of the lower main body 144.

Referring again to FIG. 9, a lower disk 252 rests in the recess 228. The lower disks 252 is preferably formed of a ceramic material and has a flat surface 250 and a smooth flat upper valving surface 258. The lower surface 250 is shown in FIG. 15. Several water passageways, best shown in FIG. 9, are provided through the lower disk 252 overlying the passageways through the lower main body 144. The gasket 248 forms a seal between the surface 230 of the lower main body 144 and the surface 250 of the ceramic disk 252. A key 254 extends upwardly from the upper surface 230 of the lower main body 144 into a keyway 256 in the lower surface 250 ceramic disk 252 and prevents relative motion therebetween.

A circular recess 262 is provided in the portion of the surface 250 of the disk 252 overlying the circular recess 236 in the upper surface 230 of the lower main body 144. Two short vertical passageways 264a and 264b are provided through the disk 252 from the upper surface 258 to the recess 262. The recess 262 and the passageways 264a and 264b together form a vertical passageway 260 for delivering mixed water upwardly through the lower disk 252. A second mixed water passageway 266 is provided vertically through the disk 252 to deliver mixed water downwardly through the disk. An opening at the lowermost end of the passageway 266 overlies the outlet water passageway 244 through the lower main body 144. Additional passageways 268h and 268c (FIG. 8) are provided through the lower disk 252 to deliver water from the auxiliary passageways 240h and 240c upwardly through the disk 252. The lower end of the passageways 268h and 268c overlie the openings to the auxiliary passageways 240h and 240c, respectively. A pair of arcuate slots 270h and 270c (FIG. 15) are provided in the upper surface 258 of the disk 252. Each of the slots 270h and 270c is open to the uppermost end of one of the passageways 240h and 240c.

An upper disk 272 rests on the top surface 258 the lower disk 252 and is coaxial therewith. The upper disk 272 is also preferably formed of a ceramic material and has a smooth lower valving surface 274 in contact with the upper valving surface 258 of the lower disk 252. As will become apparent shortly, the upper disk 272 is rotated about its axis with respect to the lower disk 252 to regulate the total volumetric flow rate of water from the outlet 92 of the faucet 30. The upper disk 272 also has a flat upper surface 276 which is shown in the drawing in FIG. 23.

The upper disk 272 has several water passageways, best shown in FIG. 9, extending between its lower surface 274 and the upper surface 276. A mixed water passageway 278 through the upper disk 272 to deliver mixed water upwardly through the disk 272. The passageway 278 has an elongated recess 280 in the top surface 276 and two short passageways 282a and 282b extending between the lower surface 274 and the recess 280. The passageways 282a and 282b are located in positions that permit each of them to be centered over one of the passageways 264a and 264b in the lower disk 252 in a first extreme relative angular orientation of the disks illustrated in FIGS. 9 and 27. When the upper disk 272 is rotated to a second extreme orientation ninety degrees with respect to the lower disk 252 from the first orientation, as illustrated in FIGS. 7, 8 and 25, the passageways 282a and 282b are moved away from the passageways 264a and 264b. Means, described later, are provided to permit a user to move the upper disk between these two extreme orientations.

Another passageway 284 extends through the upper disk 272 between the recess 280 and the lower surface 274. The passageway 284 is provided to deliver mixed water downwardly through the upper disks. A narrow arcuate slot 286 (FIG. 23) is provided through the disk 272 and extending from a portion of the passageway 284. The passageway 284 and the slot 286 are located in appropriate positions that result in the passageway 284 being centered over the passageway 266 in the lower ceramic disk when the disks are in the first relative orientation where the passageway 264a and 264b are centered over the passageways 282a and 282b. A portion of the mixed water from the passageway 282a and 282b will therefore flow through the recess 280 and then will flow downwardly through passageways 284, 266, 244, 138m and 84, consecutively, and ultimately will be discharged through the outlet water line 82 to the outlet 92 of the spout 80. When the upper disk 272 is rotated partially with respect to the lower disk 252 to an intermediate orientation shown schematically in FIG. 26, a portion of the slot 286 overlies the passageway 266. Water will continue to flow through the outlet 92, but at a slower rate. When the disk is rotated to the second orientation (FIGS. 7, 8 and 25), the slot 286 and passageway 284 move entirely out of alignment and the flow of water to the outlet 92 will be prevented.

Figure 23:
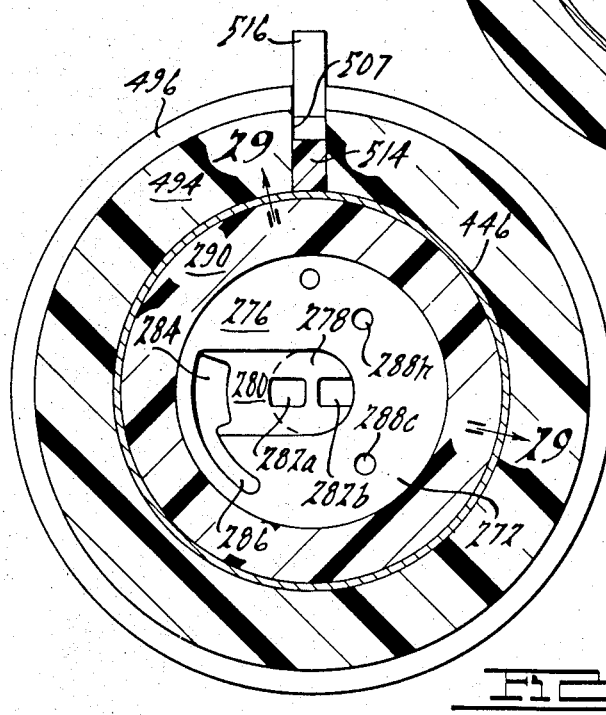
FIG. 23 is a sectional view taken along line 23—23 of FIG. 8, and illustrates the upper ceramic disk and adjacent elements.

The upper disk 272 is also provided with auxiliary vertical passageways 288h and 288c (FIG. 23). Passageway 288h is centered over a portion of the arcuate slot 270h (FIG. 15) at the two extreme orientations of the upper disk and at all orientations in between as is best shown schematically in FIGS. 25, 26 and 27. Similarly, the passageway 288c is always centered over a portion of the slot 270c.

Referring again to FIG. 7, the valve assembly 68 of the faucet further includes an upper main body 290 located above the upper disk 272. The upper main body 290 is an approximately cylindrical element and rests upon the upper disk 272 in a portion coaxial therewith. A recess 292 is cut into the lower surface 294 of the upper main body 290 and has a flat surface 296 and a cylindrical surface 298. The disk 272 is partly within the recess 292. A key 300 extends from the recessed surface 296 of the upper main body 290 into a keyway 302 in the upper surface 276 of the upper disk 272 to prevent relative rotational motion between the upper disk 272 and the upper main body 290. An annular groove 304 is provided in the cylindrical surface 298 of the recess 292. An O-ring 306 is inserted in the groove 304 and forms a watertight seal between the cylindrical surface 308 of the upper disk 272 and the cylindrical surface 298 of the upper main body 290.

Figure 20:
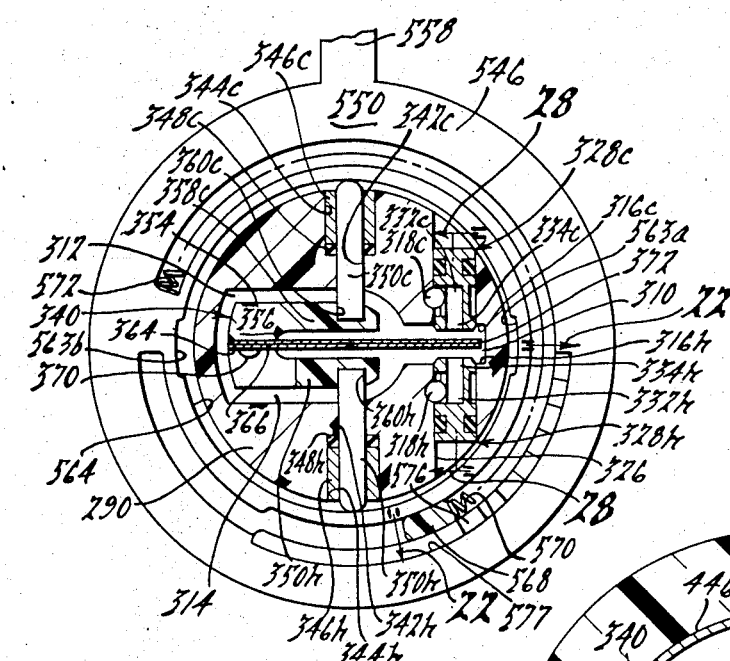
FIGS. 20 and 21 are sectional views taken along lines 20—20 and 21—21, respectively, of FIG. 7, and illustrate the temperature sensing mechanism of the servomechanism valve of the present invention, as well as adjacent elements.
Figure 21:
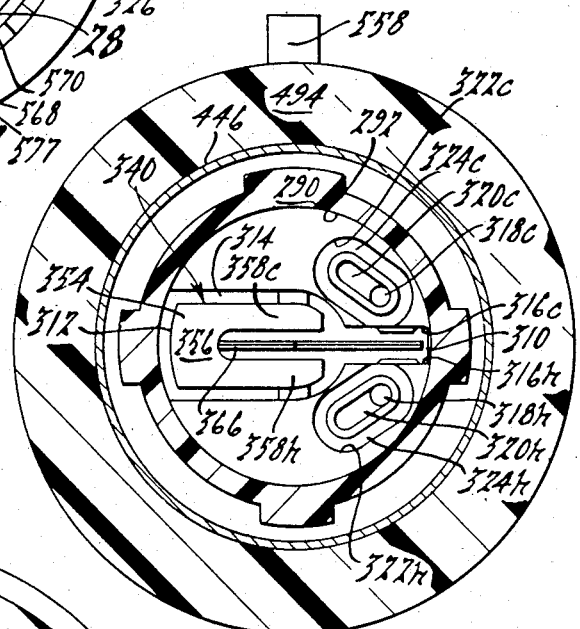

A mixing chamber 312 is provided in the upper main body 290. The mixing chamber 312 consists of a centrally located cavity in the surface 296 and overlies the recess 280 in the upper ceramic disk 272. As shown in FIGS. 20 and 21, the mixing chamber 312 has a wide portion 314 and a narrow portion 310 that generally extends radially from the wide portion 314 of the mixing chamber 312. The narrow portion 310 of the mixing chamber 312 has two flat vertical walls 316h and 316c disposed parallel to each other.

Two passageways 318h and 318c are provided through the upper main body 290 interconnecting the auxiliary water passageways 288h and 288c (FIG. 23) with the mixing chamber 312. Each of the passageways 318h and 318c is provided with an enlarged recess 320h or 320c (FIGS. 21 and 28) in the surface 308. Each recess 320h and 320c has a portion thereof centered over one of the auxiliary passageways 288h and 288c in the upper ceramic disk. An oval groove 322h or 322c is provided around each of the recesses 320h and 320c. Each groove 322h or 322c accepts an O-ring 324h or 324c that forms a watertight seal between the lower surface 308 of the upper main body 280 and the upper surface 276 of the upper ceramic disk 272. The passageways 318h and 318c extend partly through the upper main body 290 upwardly from the surface 308 of the recess 292 on opposite sides of the narrow portion 310 of the mixing chamber 312. A bore 326 (FIGS. 20 and 28) is provided horizontally through the upper main body. The bore 326 cuts transversely through each of the passageways 318h and 318c and through each of the walls 316h and 316c in the narrow portion 310 of the mixing chamber 312.

A pair of symmetrically identical nozzle assemblies 328h and 328c, best shown in FIG. 28, are provided. Each of the nozzle assemblies 328h and 328c has a cylindrical element which is inserted into the bore 326 from one of the openings 330h and 330c through the outer cylindrical surface of the upper main body and extends partly through the openings in one of the walls 316h or 316c of the mixing chamber 312. An annular groove 331h or 331c is provided around each of the nozzle assemblies 328h and 328c and is open to the corresponding auxiliary passageways 318h and 318c through the upper main body 290. A passageway 332h or 332c is provided through each of the nozzle assemblies interconnecting the corresponding annular grooves 331h and 331c with the mixing chamber 312. Each of the passageways 332h and 332c terminates in a nozzle 334h or 334c. Each of the nozzle assemblies 328h and 328c is also provided with an annular groove 336h or 336c for an O-ring 338h or 338c to form a watertight seal between each of nozzle assemblies 328h and 328c and the bore 326.

Returning to FIG. 20, a temperature responsive mechanism 340 is provided in the mixing chamber 312. A bore 342 shown in the drawing at 342h and 342c is provided radially through the upper main body 290 for mounting the temperature responsive mechanism 340. The bore 342 is parallel to the bore 326 described above and passes transversely through the wide portion 314 of the mixing chamber 312. A piston 350h or 350c reciprocates in each of the ends of the bore 342. A counterbore 344h or 344c is provided in the cylindrical outer surface of the upper main body 290 at each end of the bore 342. A bushing 346h and 346c and an O-ring 348h and 348c are inserted in each of the counterbores 344h and 344c. The O-rings 348h and 348c and bushings 346h and 346c cooperate to form a seal against leakage of fluid from the mixing chamber 312 through the bore 360.

The temperature responsive mechanism 340 includes a carrier 354 located in the central portion 314 of the mixing chamber 312. The carrier 354 is a U-shaped element having a base portion 356 and two arms 358h and 358c extending horizontally from the base portion 356. The carrier 354 is provided with a bore 360h on the arm 358h and a bore 360c on the arm 358c. One end of one of the pistons 350h and 350c is fitted into each of the bores 360h and 360c. The other end of each of the pistons 350h and 350c extends out of the ends of the bore 342. The pistons 350h and 350c are used to adjust the position of the carrier 354 in a manner that will be described later.

A part of the base portion 356 of the carrier 354 is cut away to produce a flat vertical surface 364. A flat rectangular bimetallic strip 366 is fastened at one of its ends 368 to the vertical surface 364 by means of a screw or similar fastener 370. The bimetallic strip 366 extends from the base portion 356 of the carrier between the arms 358h and 358c of the carrier. The bimetallic strip 366 is comprised of two metallic layers 374 and 376 (FIG. 28) bonded together. One of the layers, layer 374, is comprised of a material that has a comparatively high coefficient of expansion. The other layer, layer 376, is comprised of a material that has a comparatively low coefficient of expansion. An example of a bimetallic strip that has worked well in experimental faucets is a strip where layer 374 is 55% of the thickness of the strip 366 and is composed of 72% manganese, 18% copper and 10% nickle and where layer 376 is 45% of the thickness of the strip 366 and is composed of 36% nickle and 64% iron. The end 372 (FIG. 20) of the bimetallic strip 366 that is furthest from the base portion 356 is located in the narrow portion 310 of the mixing chamber 312 between the nozzle assemblies 334*h* and 334*c*.

As is well known in the art, the bimetallic strip 366 bends in response to changes in the temperature in the mixing chamber 312. For example, as the temperature of the water in the mixing chamber 312 increases, the bimetallic strip 366 bends towards the low expansion side 376 of the strip. When the strip 366 bends a predetermined amount, it covers one of the other of the nozzles 334*h* and 334*c* to adjust the position of the spool 200 in a manner that will be described later. Preferably, the space between the bimetallic strip 366 and either of the nozzle assemblies 334*h* and 334*c* is about five ten thousandths of an inch (0.005") or about one hundred and thirty microns (0.130 mm) (when the strip is centrally located) to minimize the size of a particle that may pass between the strip and the nozzle assemblies and thus to prevent large particles from getting into the control circuit passageways.

Referring now to FIG. 9, the upper main body 290 is further provided with a bore 384 and a counterbore 386 upwardly extending through the upper surface 362 from the wide portion 314 of the mixing chamber 312. A cylindrical insert 398 having a cylindrical outer sufrace 388, a flat top surface 390 and a flat bottom surface 392 is inserted in the bore 394. The insert 398 has a flange 396 around the lower portion of the cylindrical surface 388. The flange 396 abuts a shoulder 402 between the bores 384 and 386. An O-ring 404 is fitted in an annular groove 406 about the periphery of the insert 398 to form a seal between the insert and the upper main body 290. A cavity 408 is provided in bottom surface 392 of the insert 398. The insert 398 is formed of brass or any other good heat conducting material.

The passageways 232, 260, 278, elongated recess 280, mixing chamber 312, cavity 408, passageways 284, 266, 244, 138*m*, 76*m*, outlet line 82, and aerator 88 to its outlet 92, collectively define the discharge passageway which leads from the valving cavity 170.

A flat circular plate 410 rests on the top surface 390 of the insert 398 and is secured thereto by appropriate attachment means such as spot welds, not shown in the drawing. The plate 410 is also formed of a good heat conducting material. The top surface 412 of the plate 410, as shown in FIG. 6, has a temperature scale consisting of appropriate numerals 414 and scale markings 416 printed on approximately one third of its perimeter. The surface 412 is also provided with other useful indicia such as, for example, the letters H and C, each associated with an arrow 418*h* or 418*c*.

A U-shaped stamping 420 (FIG. 7) rests on the central portion of the top surface 412 of the plate 410. The stamping 420 is formed from a circular metallic plate of a good heat conducting material. The stamping 420 has a flat horizontal portion 422, a vertical cylindrical portions 424, and a horizontal annular upper portion 426. The lower portion 422 is secured to the center of the plate 410 by appropriate means, not shown, such as spot welds.

A flat circular ornamental plate 428 (FIG. 7) having a diameter less than the diameter of the plate 410 is secured to the upper surfaces of the upper portion 426 of the stamping 420 by means, for example, of two sided adhesive tape. The top surface 430 of the plate 428 is provided with appropriate indicia such as, for example, the words "ON" and "OFF" associated with arrows, as shown at 432*a* and 432*b* in FIG. 6. The indicia on the surface 430 may also include a trademark.

A bimetallic coil 434, best illustrated in FIG. 10, is provided in the gap 436 (FIG. 8) between the plates 410 and 428. The coil 434 is loosely wound generally around the cylindrical portion 424 of the stamping 420. One end 440 of the coil 434 is secured to the stamping 420 by being inserted in a slot 442 in the annular portion 426 of the stamping and being bent therebehind. The other end of the coil 434 is provided with an indicator 444. The bimetallic coil 434 acts as a thermometer by sensing the temperature of the water in the cavity 408. The coil 434 deflects in response to temperature of the stamping 420 which is approximately the temperature of the water in the cavity 408. The coil 434 moves the indicator 444 in a manner well known in the art to provide a reading on the temperature scale 416 (FIG. 6) of the temperature of the water in the mixing chamber 312.

The valve assembly 68 is further provided with a cylindrical sleeve 446 that secures together the components of the valve assembly 68, as will become apparent shortly. The sleeve 446 is fitted over the main bodies 144 and 290 and has an inner cylindrical surface 447 in contact with the outer cylindrical surfaces thereof. The sleeve 446 holds the end caps 190*h* and 190*c* (FIG. 8) within the cutaways 184*h* and 184*c* of the lower main body 144. The upper main body 290 is provided with a flange 450 around the lower portion of the cylindrical outer surface. An inwardly oriented flange 452 is provided on the upper end of the sleeve 446 and extends over a flange 450 of the upper main body 290.

An adapter ring 456 is fastened to the lowermost end of the sleeve 446. The adapter ring secures the sleeve 446, and thus the entire valve assembly 68, to the socket body 54. The adapter ring 456 is an annular member having a flat upper surface 458, a flat lower surface 460, a knurled cylindrical outer surface 462 and an internally threaded inner surface 464. The adapter ring 456 is threaded onto the threads 106 of the socket body 54. A flange 466 extends radially from the lower portion of the outer surface 462 of the adapter ring 456. A circular slot 468 is provided in the flange 466.

The lowermost end of the sleeve 446 is fitted over the surface 462 and into the slot 486 until the lower surface 148 of the lower main body 144 rests on the upper surface 458 of the adapter ring. An annular slot 470 is provided above the flange 466 in the outer surface 462 of the sleeve 466. A spring clip 472 is located within the slot 470 and secures the adapter ring 456 to the sleeve 446. The spring clip 472, best illustrated in FIG. 14, has three blips 474*a*, 474*b* and 474*d*, each removably fitted into one of three apertures 476*a*, 476*b* and 476*d* in the sleeve 446.

It is apparent therefore, that the adjusting ring 456, the spring clip 472, and the sleeve 446 cooperate to removably secure the upper main body 290 to the lower main body 144, but the upper main body 290 can be freely rotated with respect to the sleeve 446 and the lower main body 144.

The sleeve 446 is further secured to the upper main body by flange 450 and flange 452 and is prevented from rotating with respect to the lower main body by means of a spring loaded plunger assembly 478 (FIG. 9).

A bore 480 is provided radially through the cylindrical outer surface 146 of the lower main body 144. A hollow cylindrical frame 482 is provided in the bore 480. A plunger 484 is located within the bore 480 and reciprocates within the bore and through aperture 486 in the frame 482 and aperture 488 in the sleeve 448. A flange 490 around the periphery of one end of the plunger 484 keeps the piston from passing completely through the apertures 486 and 488. A spring 492 is also provided in the bore 480 and biases the plunger 484 away from the base of the bore 480.

The handle assembly 66 further comprises an ornamental shell 494. The shell 494 has an approximately spherical outer surface 496, a flat top surface 498 and a large vertical bore 500. As shown in the drawing, the shell 494 is fitted onto the valve assembly 68 by inserting the sleeve 446 into the bore 500. As shown in the drawing, the shell 494 is fitted on the valve assembly 68 by inserting the sleeve 446 into the bore 500. An internal flange 502 at the top of the shell 494 cooperates with the flange 452 on the sleeve 446 to limit the downward movement of the shell with respect to the sleeve. The shell 494 rotates freely with respect to the sleeve 446 but is constrained to rotate with the upper main body 290 by means of a key 532 (FIG. 7) in the shell 494 and a keyway 534 in the upper main body.

A partial annular groove 504 is provided extending 90° about the circumference of the annular wall of the bore 500. The groove 504, shown in FIGS. 8, 9 and 29, accepts the end of the plunger 484. The plunger thereby removably secures the shell to the valve assembly and limits the rotation of the shell with respect to the valve assembly. A small diameter radial bore 506 extends from the outer surface 496 of the shell 494 to the annular groove 504. The shell 494 may be separated from the valve assembly 68 by rotating the shell until the plunger 484 is aligned with the bore 506 and inserting into the bore a small diameter rod, such as a bent paperclip, to retract the plunger.

The shell 494 has a cavity 507, illustrated in FIGS. 7 and 29, comprising a vertical slot 508 through the wall between the outer surface 496 and the bore 500. The cavity 507 is extended partly above and partly below the slot 508 by an upper slot 510 and a lower slot 512 each extending partly into the surface of the bore 500. The cavity 507 is open to one end of the partial annular groove 504 (FIG. 8). It should be noted here that the shell 494 and the upper main body 290 are designed so that, when the handle is rotated to the position where the plunger 484 is in the slot 508, the valves are in the closed position shown schematically in FIG. 25. This position of the element is hereafter referred to as the "OFF" position.

A lever 514 reciprocates vertically within the cavity 507. The lever 514 is part of a selectively disengageable stop assembly, the operation of which is described in detail later, for limiting the maximum hot water temperature setting. An integral portion of the lever 514 extends outwardly from the main portion of the lever to form a manually operable handle 516. Printed matter, such as a downwardly pointed arrow or the word "HOT" may be printed on or engraved into the exterior surface of the handle 516. A vertical bore 526 is provided in the base of the lever 514. A coil compression spring 528 has one of its ends partly inserted into the bore 526. The other of the ends of the spring 528 rest on the lower surface 530 of the lower slot 512. The spring 528 thereby biases the lever 514 upwardly.

A surface 532 of the lever 514 is in contact with and slides against the outer surface of the sleeve 446. A horizontal slot 536 is provided in the surface 532 and is in line with the groove 504 (FIG. 9) in the shell 494 such that, when the shell 494 is near the OFF position, the end of the plunger 484 is in the slot 536. The slot 536 has a sloping lower surface 540 that cooperates with the plunger 484 to force the lever 514 downwardly when the handle is in the OFF position as shown in FIG. 29.

A cap assembly 544 rests above the shell 494 and covers the upper main body 290. The cap assembly 544 consists of an adjusting ring 546 and a lens 548. The adjusting ring 546 is an annular element having a flat lower surface 550 resting on the upper surface 498 of the shell 494. The adjusting ring also has a flat upper surface 552, a cylindrical inner surface 554, and an outer surface 556. The outer surface 556 is shown having generally spherical curvature to blend in with the outer surface 496 of the shell 494. A manually operable handle lever position 558 extends from the outer surface 498 of the ring 546. The inner surface 554 is provided with flanges 560a and 560b that cooperate with tabs 562a and 562b on the upper main body 290 to removably secure the elements together. The flanges 560a and 560b are notched, as shown at 563a and 563b in FIG. 20, for removal of the cap assembly 544 from the valve assembly 68.

The inner surface 554 of the adjusting ring 546 is provided with an eccentric counterbore 564 in contact with the ends of the pistons 350h and 350c supporting the carrier 354. Due to the frictional forces, the adjusting ring 546 rotates with the shell 494 and the upper main body 290 unless a force is applied to the handle 558. When a force is applied to the handle 558 so that the adjusting ring 548 may be rotated with respect to the shell 494 and the main body 290, the eccentric counterbore 564 reciprocates the pistons 350h and 350c. As will be discussed later, the adjusting ring thereby is used to preselect the temperature of the outlet water for the faucet 30.

A circular slot 566, best shown in FIG. 20, is provided in the lower surface 550 of the adjusting ring 546. The upper end of the lever 514 has a boss 568 that extends upwardly from the upper surface 498 of the shell 494 into the slot 566. A stiff coil compression spring 570 is located in the slot 566. The spring 570 extends between a surface 572 at the end of the slot 566 and a surface of the boss 568. The cap assembly can be freely rotated counterclockwise from the position shown in FIG. 20 (clockwise with reference to FIG. 6) since the upper end 568 of the lever 514 will be moved away from the spring 570. Rotation in the clockwise direction (counterclockwise with reference to FIG. 6) will be resisted by the spring 570. The spring 570 thereby prevents the adjusting ring 546 from being easily turned with respect to the shell beyond a predetermined angular position and thus prevent the user from inadvertently setting the faucet at a temperature above a predetermined maximum setting. The maximum setting is preferably one hundred degrees Fahrenheit (100° F.) corresponding to approximately thirty-eight degrees centrigrade (38° C.).

Figure 22:
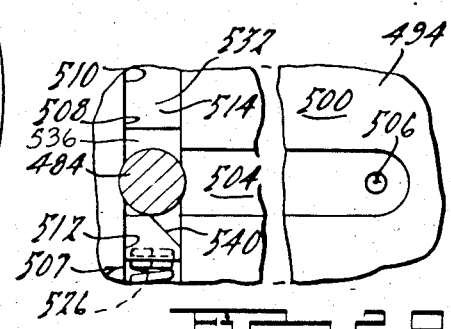
FIG. 22 is a partial sectional view taken along line 22—22 of FIG. 20, and illustrates a portion of a selective disengagable stop mechanism inhibiting the user from accidentally setting the temperature above a predetermined maximum setting.

The lower surface 550, of the adjusting ring 546, is also provided with an annular cutaway 577 and a series 576 of detents, illustrated in FIG. 22. The series 576 of detents permit the user to selectively overcome the effect of the spring 570 and to thereby exceed the predetermined maximum setting. Each of the detents consists of a notch 578a through 578h and each has a wall 580a through 580h that acts as an abutment for a pawl 582 that extends upwardly from the end 568 of the lever 514 into the region of the cutaway 577. When the faucet 30 is in the OFF position, the pawl 582 is held away from the detents by the plunger 484 (FIG. 7). When the faucet 30 is not in the OFF position, the spring 528 biases the lever 514 upwardly and thus permits the pawl 582 to be positioned in one of the detent notches 578a through 578h.

The upper body 290 may also include an indicator 584, illustrated in FIG. 6. The indicator 584 notifies the user of the temperature that has been preselected so that it can be compared with the temperature that has been achieved, as indicated by the indicator 444.

Returning to FIG. 9, the lens 548 of the cap assembly 544 is a transparent element formed of plastic or glass. The lens has a flat lower surface 586 and a curved upper surface 588. The upper surface 588 has a spherical curvature to aesthetically complete the exterior of the handle assembly 78. Two bosses, not shown in the drawing, extend downwardly from the lower surface 586 and are fitted into apertures, also not shown in the drawing, in upper surface 552 of the adjusting ring 546 to secure the two elements together. The lens 548 is preferably also heat sealed to the adjusting ring 546.

The lens 548 is provided with an internal cavity 590 for the upper elements of the valve assembly 68. The cavity 590 consists of four concentric bores 592a, 592b, 592d and 592e, extending partly through the lens 548. As seen in FIG. 6, the lens 548 protects the upper elements of the valve assembly yet permits the user to view the top surface 430 of the plate 428, the top surface 412 of the plate 410, and the temperature indicators 444 and 584.

2. Function of the Preferred Embodiment

The faucet 30 of the present invention is operated by manually rotating the cap assembly to preselect the temperature of the water to be discharged from the outlet 92 of the spout 80. The shell 494 is manually rotated to adjust the flow rate of water discharged from the outlet 92 of the spout 80. The function of the faucet 30 is best understood by first reviewing the path that water takes through the valve assembly. The water path is best illustrated in FIGS. 7, 8 and 9.

Figure 13:
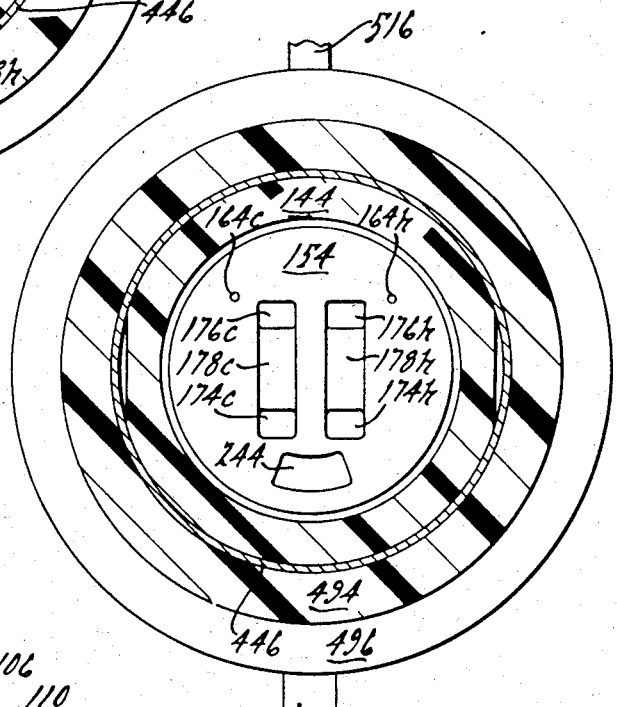
FIG. 13 is a sectional view taken along line 13—13 of FIG. 8, and illustrates the lower portion of the lower main body as well as adjacent elements.

Pressurized hot water is supplied to the valving cavity 170 by flowing consecutively through supply line 70h, (FIG. 3) the passageway 76h in the socket body 60, the passageway 138h in the adapter plug 120 and the passageways 174h and 176h in the lower main body 144. The pressurized hot water is delivered to the valving cavity 170 from the two passageways 174h and 176h instead of just one passageway so that the pressure exerted by the water on the cylindrical wall 202 of the spool 200 will be balanced. Similarly, pressurized cold water is supplied to the valving cavity through supply line 70c (FIG. 5), through the passageway 76c (FIG. 14), through the passageway 138c (FIG. 12) and finally through the passageways 174c and 176c (FIG. 13).

As illustrated in FIG. 17, the pressurized hot and cold water from each of the passageways 174c, 174h, 176c and 176h flows into the annular groove 216 of the spool 200 and is mixed therein. A portion of the mixed water in the annular groove 216 travels along the bores 218 and 220 in the spool 200 and into the auxiliary chamber 214h on one side of the spool 200. As shown in FIG. 8, the mixed water from the auxiliary chamber 214h flows into the passageway 240h through the lower main body 144 and through the passageway 268h and the slot 270h in the lower ceramic disk 252. The mixed water flows from the slot 270h through the passageway 288h (FIG. 23) in the upper disk 272, then through passageway 318h (FIG. 21) in the upper main body 290 and through the nozzle assembly 328h (FIG. 20) into the mixing chamber 312. Similarly, a portion of the mixed water in the annular groove 216 travels through the bores 218 and 220 into the auxiliary chamber 214c and from there flows consecutively through passageways 240c, 318c, 268c and 288c and through the nozzle assembly 328c into the mixing chamber 312.

A portion of the mixed water in the annular groove 216 also flows through the passageway 232 (FIG. 9) in the lower main body 144 into the passageway 260 in the lower disk 252.

As long as there is sufficient water pressure in the supply line 70h and 70c, there will always be pressurized water in each of the above-listed passageways whether the faucet is in use or not. If, however, the hot or the cold water pressure falls below a predetermined minimum level, the check valve 156h or the check valve 156c will close the corresponding passageway 138h or 138c and prevent the water from flowing backwards from the valve assembly into one of the supply lines 70h or 70c. The check valves 156h and 156c thereby prevent contamination of the water.

When the faucet is in the OFF position illustrated in FIGS. 7, 8 and 25, the passageways in the lower ceramic disk 252 are positioned away from the passageway in the upper ceramic disk 272.

When the faucet is to be operated, the user rotates the shell 494 counterclockwise as indicated in FIG. 6. As the shell 494 is rotated, the upper main body 290, the cap assembly 544 and the upper valve disk 272 are rotated together as a unit and the apertures in the valving surfaces of the valve disks 252 and 272 come into alignment, as indicated in FIGS. 26 and 27. Mixed water from the passageway 260 in the lower disk 252 flows through the passageways 282a and 282b in the upper disk 272 into the mixing chamber 312. The bimetal coil 434 measures the temperature of the water in the mixing chamber 312 and indicates the measurement on the scale 416 (FIG. 6).

The apertures of the passageways 264a, 264b and 266 in the upper surface 258 of the lower disk 252 are increasingly open to the apertures of the passageways 282a, 282b, and 284 in the lower surface 274 of the upper disk 272 as the shell 494 is rotated from the OFF position of FIG. 26 to the maximum position of FIG. 27. The total flow rate of the mixed water into the mixing chamber (and ultimately discharged at the outlet 92) is therefore increased continuously as the shell 494 is rotated from the OFF position to the maximum position.

A portion of the mixed water from the passageways 282a and 282b and from the mixing chamber 312 flows through the recess 280 and then through the passageway 284 in the upper disk 272. From the passageway 284, the water flows downwardly through passageway 266 in the lower disk 252, the passageway 244 in the lower main body 144, the passageway 138m in the adapter plug 120, the passageway 76m in the socket body 54 and the outlet water line 82 (FIG. 3) to the outlet 92 of the spout 80. The temperature of the water at the outlet 82 will be approximately the same as the temperature of the water in the mixing chamber 312 and therefore may be determined by the user by observing the scale 416 (FIG. 6).

The bimetallic strip 366 (FIG. 20) deflects in response to the temperature of the water in the mixing chamber 312. The end 372 of the bimetallic strip 366 moves toward the nozzle 344c when the water temperature is below the preselected temperature and moves towards the nozzle 334h when the water temperature is above the preselected temperature. The end 372 moves to a central position between the two nozzles when the water temperature is at the preselected temperature.

If the water in the mixing chamber 312 is colder than the preselected temperature, the end 372 of the strip 366 moves to cover the nozzle 344h. This causes an increase in pressure along the auxiliary passageways 240c, 268c and 288c leading to the auxiliary chamber 214c and, thus, an increase in the pressure in the auxiliary chamber 214c. This temporary increase in pressure results in a pressure differential between the water in the auxiliary chamber 214c and the water in the auxiliary chamber 214n which pressure differential causes the spool 200 to shift towards the auxiliary chamber with the lower pressure, in this instance, auxiliary chamber 214h. The spool 200 is shown in the shifted position in FIG. 18. In the shifted position, the portion of the surface areas of the hot water apertures 174h and 176h that is open to the annular region 216 around the spool 200 is increased. Simultaneously, the portions of the surface areas of the cold water apertures 174c and 176c that are open to the annular region 216 is decreased. The mixed water in the annular region 216 is warmer than the mixed water was prior to shifting the spool yet the flow rate of water in the mixing chamber 312 should be approximately the same. When the temperature of the water in the mixing chamber 312 increases to the preselected temperature, the end 372 of the bimetallic strip 366 deflects away from the nozzle 334c and the spool 200 stops moving. The temperature indicator 444 of the thermometer coil 434 indicates that the desired temperature has been achieved.

If the water in the mixing chamber 312 is warmer than the preselected temperature, the end of the strip 366 covers the nozzle 334h. This temporarily shifts the spool in the opposite direction, as shown in FIG. 19. The strip 366 is restored to a neutral position when the preselected temperature is obtained.

It should be noted that the spool 200 can shift to an extreme position, illustrated in FIG. 19, where no hot water is admitted into the annular 216. Thus, in the event that there is an absence of cold water being supplied to the faucet 30, the spool will shift to a position shutting off the hot water. Therefore, the faucet 30 ceases to discharge any water unless the preselected temperature is identical to the temperature of the hot water being supplied to the faucet whenever the cold water pressure decreases sufficiently to cause the check valve 156c to close. As described with respect to the hot water supply, in the event that the pressure in the cold water supply decreases sufficiently to cause the check valve 156c to close, the spool 200 will shift to an extreme position (not shown in the drawing) to shut off the flow of hot water through the valve assembly 68.

The cap assembly 544 may be rotated manually by the user to preselect a different temperature for the water in the mixing chamber. The cap assembly 544 is rotated until the indicator 444 (FIG. 6) points to the desired temperature on the scale 416. As the cap assembly 544 is rotated about the axis of the upper main body 290, the eccentric groove 564 (FIG. 20) causes the carrier 354 and the bimetallic strip 366 to shift to one side or the other. Rotation of the lever portion 558 and the cap assembly 544 clockwise (as viewed in FIG. 6) moves the end 372 of the bimetallic strip 366 closer to the nozzle 334h associated with the auxiliary chamber 214c. The amount of deflection of the end 372 of the bimetallic strip 366 increases continuously as the water in the mixing chamber 312 increases in temperature. Therefore, if the end 372 is moved closer to the nozzle 334h, the end 372 will deflect enough to cover the nozzle 334h at a temperature lower than the temperature that would have caused the strip to cover the nozzle prior to the adjustment. The spool 200 will therefore seek a position that will produce a lower temperature of discharge water at the outlet 92.

In general, the preselected temperature may be set whether or not the faucet 30 is in operation as long as the temperature. As mentioned earlier, the faucet 30 is provided with a selectively disengagable stop mechanism that limits the maximum temperature that may be preselected when the shell is in the OFF position. This mechanism is provided to protect the user against accidentally setting the temperature too high and being scalded. In the preferred embodiment, the user cannot preselect a temperature above 100° F. when the faucet 30 is not in operation. When the cap assembly 544 is rotated to the orientation corresponding to 100° F., the front surface 574 of the end 568 of the lever 514 encounters one end of the spring 570. Since the spring 570 is stiff, an attempt to rotate the cap assembly 544 further requires more effort than is required to rotate the cap assembly between setting below 100° F. Furthermore, the spring 570 will immediately restore the thermostat to a setting at or below 100° F. when the cap assembly 544 is released by the user.

When the faucet 30 is in operation, however, the user can temporarily preselect a temperature above 100° F. When the shell 494 is in the OFF position of FIG. 7, the plunger 484 of the plunger assembly 478 is in the slot 536 in the lever 514. The plunger 484 therefore holds the lever 514 down against the force of the spring 528. When the shell 494 is rotated from the OFF position of FIG. 7, the piston 484 is moved out of the slot 536. Therefore, when the faucet 30 is in operation, the spring 528 biases the lever 514 upwardly. The boss 568 on the upper end of the lever 514 is raised against the lower surface of the cap assembly 544. When the cap assembly 544 is rotated to the orientation corresponding to 100° F., the boss 568 of the lever 514 encounters the end of the spring 570 and the pawl 582 encounters the detents 576. The wall prohibits further rotation of the cap assembly 544. If the user rotates the cap assembly 544 further, the pawl 582 will rise into the first detent 578a. If the user releases the cap assembly 544, the spring 570 will attempt to rotate the cap assembly counterclockwise and will therefore move the pawl 582 up against the abutment 580a. The user can manually reset the temperature when desired by depressing the lever 514 to disengage the pawl 582 from the detent 578a and permit the spring 570 to restore the cap assembly to a setting corresponding to a preselected temperature below 100° F. In a similar manner, the user can preselect temperature setting corresponding to each of the detents 578a through 578h.

The user does not have to reset the temperature manually to a setting below 100° F. When the shell 494 is rotated towards the OFF position, the plunger 484 once again enters the slot 536 in the lever 514. As the shell 494 is rotated into the OFF position, the plunger 484 acts against the camming surface 540 of the slot 536 and drives the lever 514 downwardly, thereby disengaging the pawl 582 from the detents 576. The spring 570 then restores the cap assembly 544 to a temperature setting below 100° F.

3. Variations and Modifications

FIGS. 30 through 37 illustrate several modifications that may be made to the handle assembly 66 and the valve assembly 68 of the present invention.

In the modified handle assembly 66' the plunger assembly 478 and the spring clip 472 (FIG. 7) have been replaced by a pair of molded buttons 600, only one of which is shown in the drawing (FIGS. 35 and 37). An annular space 650 is provided between the sleeve 446' and the shell 494'.

The buttons 600 removably secure the handle assembly 66' to the adapter ring 456'. A tab 652 extends from a flat 654 cut into the lower main body 114'. Each of the buttons 600 has an upper pair of inwardly oriented bosses 603a and 603b and a lower inwardly oriented boss 605. A rectangular flange 656 also extends outwardly from each of the buttons 600. Each of the buttons 600 is fitted into one of two apertures 602 spaced 180 degrees apart (only one of which is shown in the drawing) in the lower portion of the sleeve 446' and clamps to a perimetal lip 604 of the adpater ring 456' with the bosses 603a and 603b on either side of the tab 652.

An outwardly oriented cylindrical boss 606 extends from one of the buttons 600 into the annular region 650 between the sleeve 446' and the shell 494'. In the OFF position of the faucet, the boss 606 rests against a camming surface 608 in a slot 610 in the lever 514'. The boss 606 functions similarly to the plunger 484 (FIG. 7) of the earlier described handle assembly 66 to drive the lever 514' downwardly away from the detents 576 when the handle assembly 66' is in the OFF position. A compression coil spring 612 is provided in an aperture 614 in the handle 516' of the lever 514' to bias the lever 514' upwardly when the handle assembly 66' is in any operating position.

In the modified valve assembly 68', the cold water check valve 156c has been eliminated. The hot water check valve 156h is retained and is positively driven to close when the handle assembly 66' is in the OFF position by means of a vertically disposed rod 616. The lowermost end of the rod 616 rests in the aperture 160 in the head of the check valves 156h (FIG. 30). The rod 616 extends upwardly from the aperture 160, through the slot 178h through an aperture 618 in the lower main body 144' (FIGS. 31 and 33) and through an aperture 620 in the lower valving disk 252' (FIG. 32). A circular groove 622 (FIG. 33) is provided in the upper surface 230 of the lower main body 144' around the aperture 618. The gasket 248 is modified as shown at 248' in FIG. 33 to seal the aperture 618 against leakage. The uppermost end of the rod 616 rests in an arcuate slot 624 (FIG. 34) in the lower surface of the upper disk 272'. The slot 624 has a horizontal camming surface that drives the rod 616 downwardly when the handle assembly 66' is in the OFF position but permits the check valve 156h to be raised by the hot water pressure when the handle is any operating position.

The valve assembly 68' also includes modified cross-sections for the passageways 264a', 264b', 282a', 282b' and 284'. The cross-sectional areas of each of these passageways has been reduced to decrease the force exerted by the water on the upper ceramic disk 272 when the faucet 30 is any position other than the maximum flow rate position and thereby to minimize wear on the components of the valve assembly 68'.

FIG. 36 illustrates a modified temperature adjusting mechanism 340'. The two pistons 350h and 350c of the first described faucet 30 have been replaced by a single rod 628 that has screw threads on a centrally located portion 630. The rod 628 is passed through the bushing 346h and through the bore 342h, is threaded through a threaded bore 632h in the arm 358h' of the carrier 354' and through a threaded bore 632c in the arm 358c' and then is passed through the bore 342c and the bushing 346c. The use of the threaded rod 628 permits the temperature adjusting mechanism 340' to be calibrated so that the preselected temperature indicated by the indicator 584 (FIG. 6) corresponds to the actual temperature produced by the temperature adjusting mechanism 340' as indicated by the indicator 484.

Other variations and modifications from the preceding description and the appended drawings will be apparent to one skilled in the art. For example, the specific shapes and contours of the housing 38, the ornamental shell 494, the lever 514 and the cap assembly 544 may vary from that shown in the drawing and have only ornamental significance.

The socket 54 may be of any convenient shape. What is necessary is that the upper portion of the socket have three apertures, each at the end of passageways that can be interconnected with the supply lines 70h and 70c and the outlet line 82. In the preferred embodiment, however, the socket body 54 is identical to the valve body of a single handle faucet valve.

Examples of other valve bodies that may be used as socket bodies in conjunction with a valve assembly according to the present invention as disclosed in U.S. Pat. Nos. 2,592,062 (issued Apr. 8, 1952), 3,170,488 (issued Feb. 23, 1965), 3,384,119 (issued May 21, 1968), 3,417,783 (issued Dec. 24, 1968), 3,506,036 (issued Apr. 14, 1970), 3,519,018 (issued July 7, 1970), 3,623,510 (issued Nov. 30, 1971), 3,645,493 (issued Feb. 29, 1972), 3,747,641 (issued July 24, 1973), 3,872,890 (issued Mar. 25, 1975), and 3,882,897 (issued May 13, 1975). The disclosure of these eleven patents are hereby incorporated by reference.

A socket body identical to one of these valve bodies is preferred since the tooling may already be in existence for the production of these elements and thus the cost of production is reduced. Additionally, many single handled faucets have been manufactured using these valve members and many are currently installed in homes and businesses. The use of a valve assembly fitted to one of these existing valve members makes it possible to produce a valve assembly module according to the present invention that is capable of replacing the handle and associated hardware of existing single handled faucets without requiring replacement of the escutcheon housing 38, and the socket body 54 that are already in inventory or installed.

It is readily apparent from the above that the present invention provides a reliable and compact thermostatically controlled valve assembly wherein all the valving elements and temperature sensing elements are disposed within a handle assembly. The handle assembly is adapted to be fitted to the valve body of an existing single handle faucet. This configuration permits easy access for servicing and repair of internal valve components. This configuration further permits the use of a temperature indicating element visible on the exterior of the handle assembly to indicate the temperature of water in a mixing chamber within the handle assembly. This configuration permits the use of a temperature setting element mounted to the top of the handle assembly. This configuration also permits the use of a compact stop element mounted to the handle to prevent the user from unintentionally setting the temperature too high.

The present invention provides a reliable thermostatically controlled valve assembly using a feedback servomechanism. It also provides a thermostatically controlled valve assembly that may be mounted within the total volumetric flow control handle of a faucet.

The present invention provides a thermostatic faucet module that may be easily adapted to be fitted to the socket of an existing single handled faucet, the module replacing the handle and some adjacent hardware of the existing faucet. The present invention also provides a single handle faucet having a temperature indicating element mounted to the handle. Finally, the present invention provides a thermostatically controlled faucet having a stopping means preventing the user from unintentionally setting the temperature higher than a predetermined maximum level yet permitting the user to intentionally exceed the predetermined maximum level.

The preceding detailed description describes the best mode contemplated by the inventor at the time of filing for carrying out the present invention. Further variations and modifications not departing from the spirit of the present invention may be apparent to those skilled in the art and are included within the intended scope of the appended claims.

What is claimed as novel is as follows:

1. A single handle mixing faucet characterized by:
a cold water inlet;
a hot water inlet;
a mixed water discharge passageway;
a valve mechanism within said faucet to regulate the relative rates of discharge of cold and hot water from said respective cold water and hot water inlets, and the total rate of discharge into said discharge passageway;
a handle operably connected to said valve mechanism and manually operable to control said valve mechanism;
a thermometer mounted to said handle;
said thermometer having an indicator means for indicating temperature that is visible when one looks at said handle;
said thermometer having a sensing portion means for sensing the temperature of water in said discharge passageway; said sensing portion being free from translational movement in said discharge passageway as said handle is operated;
said indicator means being mounted in a cap assembly;
said cap assembly being mounted on an exterior portion of said handle; and
said cap assembly having a transparent portion through which said indicator means is visible.

2. A single handle mixing faucet as defined in claim 1 wherein said cap assembly is mounted at an upper portion of said handle and said transparent portion is above said indicator means so that said indicator means can be viewed from above.

3. A single handle mixing faucet as defined in claim 1 wherein a lever portion extends outwardly from said cap assembly; and
said lever portion is connected to said cap assembly such that rotation of said lever rotates said cap assembly and operates the valve mechanism to regulate the relative rates of discharge from said inlets to said discharge passageway.

4. A single handle mixing faucet characterized by:
a cold water inlet;
a hot water inlet;
a mixed water discharge passageway;
a valve mechanism within said faucet to regulate the relative rates of discharge of cold and hot water from said respective cold water and hot water inlets, and the total rate of discharge into said discharge passageway;
a handle operably connected to said valve mechanism and manually operable to control said valve mechanism;
a thermometer mounted to said handle;
said thermometer having an indicator means for indicating temperature that is visible when one looks at said handle;
said thermometer having a sensing portion means for sensing the temperature of water in said discharge passageway; said sensing portion being free from translational movement in said discharge passageway as said handle is operated;
a lever portion extending outwardly from said handle; and
said lever portion being connected to said indicator means of said thermometer such that rotation of said lever rotates said indicator means of said thermometer.

5. A single handle mixing faucet as defined in claim 4 wherein rotation of said lever controls the valve mechanism to regulate the relative rates of discharge from said inlets to said discharge passageway.

6. A single handle mixing faucet as defined in claim 5 wherein said indicator means is oriented with respect to said lever to be read from a direction of said lever.

7. A single handle mixing faucet as defined in claim 1 further characterized by:
said cap assembly having a contoured outer surface that blends with the outer surface of said handle so that said cap assembly and handle form a smooth single assembly.

8. A single handle mixing faucet characterized by:
a cold water inlet;
a hot water inlet;
a mixed water discharge passageway;
a valve mechanism within said faucet to regulate the relative rates of discharge of cold and hot water from such respective cold and hot water inlets;
a handle operably connected to said valve mechanism and manually operable to control said valve mechanism;
said handle having a cap assembly with a transparent window portion; one of said cap assembly and handle having tabs, the other of said cap assembly and handle having receiving means for receiving said tabs for releasably connecting said cap assembly to said handle;
said cap assembly having a contoured outer surface that blends with the outer surface of said handle;
a thermometer mounted to said handle;
said thermometer having an indicator means for indicating temperature, said indicator means being visible when one looks at said transparent window portion; and said thermometer having a sensing portion for sensing the temperature water in said discharge passageway, said sensing portion being free from translational movement within said discharge passageway as said handle is operated.

9. A single handle mixing faucet as defined in claim 8 further characterized by:
said cap assembly is mounted on the top portion of said handle with said indicator means facing upward for a viewer to view the thermometer indicator means from above.

10. A single handle mixing faucet as defined in claim 9 wherein a lever portion extends outwardly from said cap assembly; and
said lever portion is connected to said cap assembly and said valve is constructed such that rotation of said lever rotates said cap assembly and operates the valve mechanism to regulate the relative rates of discharge from said inlets to said discharge passageway.

11. A single handle mixing faucet characterized by:
a cold water inlet;
a hot water inlet;
a mixed water discharge passageway;
a valve mechanism within said faucet to regulate the relative rates of discharge of cold and hot water from said respective cold and hot water inlets to said discharge passageway;
a handle operably connected to said valve mechanism;
a cap assembly mounted onto said handle;
said cap assembly housing an indicator means of a thermometer for indicating temperature;
said thermometer having a sensing portion means for sensing the temperature of fluid in said discharge passageway;
said valve mechanism being connected to said cap assembly such that rotation of said cap assembly controls the relative rates of discharge of said hot and cold water into said passageway;
said cap assembly being rotationally mounted with respect to said handle such that independent rotation of said cap assembly relative to said handle controls the relative rates of discharge of said hot and cold water into said discharge passageway; and
said handle being operable to move said valve mechanism to control the total volumetric discharge into said discharge passageway.

* * * * *